US009722760B2

(12) United States Patent
Stern-Berkowitz et al.

(10) Patent No.: US 9,722,760 B2
(45) Date of Patent: Aug. 1, 2017

(54) METHODS FOR DYNAMIC TDD UPLINK/DOWNLINK CONFIGURATION

(71) Applicant: INTERDIGITAL PATENT HOLDINGS, INC., Wilmington, DE (US)

(72) Inventors: Janet A. Stern-Berkowitz, Little Neck, NY (US); Pouriya Sadeghi, Verdun (CA); Nobuyuki Tamaki, Melville, NY (US); Moon-il Lee, Farmingdale, NY (US); Ghyslain Pelletier, Laval (CA); Li-Hsiang Sun, Smithtown, NY (US); Marian Rudolf, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 14/038,386

(22) Filed: Sep. 26, 2013

(65) Prior Publication Data
US 2014/0086112 A1 Mar. 27, 2014

Related U.S. Application Data

(60) Provisional application No. 61/705,936, filed on Sep. 26, 2012, provisional application No. 61/753,354, (Continued)

(51) Int. Cl.
*H04L 5/14* (2006.01)
*H04L 1/18* (2006.01)
(Continued)

(52) U.S. Cl.
CPC .............. *H04L 5/14* (2013.01); *H04L 1/1822* (2013.01); *H04L 1/1854* (2013.01);
(Continued)

(58) Field of Classification Search
CPC .......... H04L 5/14–5/1492; H04L 5/001; H04L 5/0037–5/0057; H04L 5/0094–5/0096; H04L 1/18–1/1896
See application file for complete search history.

(56) References Cited

U.S. PATENT DOCUMENTS

2011/0176461 A1 7/2011 Astely et al.
2013/0194980 A1* 8/2013 Yin et al. ................... 370/280
(Continued)

FOREIGN PATENT DOCUMENTS

CN 101132262 A 2/2008
CN 101932113 A 12/2010
(Continued)

OTHER PUBLICATIONS

Interdigital, "On L1 based signaling mechanisms in support of eIMTA," 3GPP TSG-RAN WG1 Meeting #72bis, R1-131341, Chicago, Illinois, USA (Apr. 15-19, 2013).
(Continued)

*Primary Examiner* — Marcus R Smith
(74) *Attorney, Agent, or Firm* — Volpe and Koenig, P.C.

(57) ABSTRACT

A method and apparatus for Time Division Duplex (TDD) operation in a wireless transmit/receive unit (WTRU) are disclosed. The method includes receiving a first TDD uplink (UL)/downlink (DL) configuration for a serving cell, receiving a second TDD UL/DL configuration for the serving cell, receiving an indication of directions to use for subframes with conflicting directions between the first TDD UL/DL configuration and the second TDD UL/DL configuration, using the first TDD UL/DL configuration for timing of UL scheduling and UL Hybrid Automatic Repeat Request (HARQ), using the second TDD UL/DL configuration for timing of DL scheduling and DL HARQ, and determining a direction for each subframe with conflicting directions based on the received indication, wherein on a condition that the
(Continued)

determined direction for a subframe with conflicting directions is DL, receiving in the subframe in the DL.

30 Claims, 15 Drawing Sheets

Related U.S. Application Data filed on Jan. 16, 2013, provisional application No. 61/863,359, filed on Aug. 7, 2013.

(51) Int. Cl.
    *H04W 72/12*     (2009.01)
    *H04L 5/00*     (2006.01)
    *H04B 7/26*     (2006.01)
    *H04L 1/00*     (2006.01)

(52) U.S. Cl.
    CPC ....... *H04W 72/1289* (2013.01); *H04B 7/2656* (2013.01); *H04L 1/1812* (2013.01); *H04L 5/0055* (2013.01); *H04L 2001/0093* (2013.01)

(56) References Cited

U.S. PATENT DOCUMENTS

2013/0194981 A1*   8/2013   Wang et al. ................. 370/280
2013/0250772 A1    9/2013   Yin

FOREIGN PATENT DOCUMENTS

| | | |
|---|---|---|
| CN | 102064879 A | 5/2011 |
| WO | 12/113131 | 8/2012 |
| WO | 2012/106840 A1 | 8/2012 |

OTHER PUBLICATIONS

Interdigital, "Signaling mechanisms to support TDD UL-DL reconfiguration," 3GPP TSG-RAN WG1 Meeting #72, R1-130232, St. Julian's, Malta (Jan. 28-Feb. 1, 2013).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.4.0 (Sep. 2013).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.6.0 (Jun. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.0.0 (Sep. 2012).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.3.0 (Jun. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.7.0 (Sep. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.10.0 (Jun. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.4.0 (Sep. 2013).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.6.0 (Sep. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.9.0 (Sep. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.3.0 (Sep. 2013).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.12.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.16.0 (Sep. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.7.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.11.0 (Sep. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.5.0 (Sep. 2013).
Third Generation Partnership Project, "Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)," 3GPP TR 36.828 V11.0.0 (Jun. 2012).
Huawei, et al, "Methods to Support Different Time Scales for TDD UL-DL Reconfiguration," 3GPP TSG-RAN WG1 Meeting #69, R1-122909, Prague, Czech Republic (May 21-25, 2012).
LG Electronics, "TDD DL-UL Reconfiguration Methods for eIMTA," 3GPP TSG-RAN WG1 Meeting #69, R1-122318, Prague, Czech Republic (May 21-25, 2012).
Qualcomm Incorporated, "Signaling Mechanisms for Reconfiguration," 3GPP TSG-RAN WG1 #72bis, R1-131629, Chicago, IL, USA (Apr. 15-19, 2013).
Ad Hoc Chairman (Samsung), "Summary of Ad-hoc session on 3D-channel model for Elevation Beamforming and FD-MIMO," 3GPP TSG RAN WG1 Meeting #74, R1-133983, Barcelona, Spain (Aug. 19-23, 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP Ts 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.11.0 (Sep. 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.3.0 (Sep. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.7.0 (Sep. 2013).
MCC Support, "Draft Report of 3GPP TSG RAN WG1 #74 v0.1.0 (Barcelona, Spain, Aug. 19-23, 2013)," last modified Sep. 2, 2013, for presentation at 3GPP TSG RAN WG1 Meeting #74bis, R1-13xxxx, Guangzhou, China, (Oct. 7-11, 2013).

\* cited by examiner even-numbered slots  odd-numbered slots
Antenna port 8

METHODS FOR DYNAMIC TDD UPLINK/DOWNLINK CONFIGURATION

CROSS REFERENCE TO RELATED APPLICATIONS

This application claims the benefit of U.S. Provisional Patent Application No. 61/705,936 filed Sep. 26, 2012, U.S. Provisional Patent Application No. 61/753,354 filed Jan. 16, 2013, and U.S. Provisional Patent Application No. 61/863, 359 filed Aug. 7, 2013, the contents of which are hereby incorporated by reference herein.

BACKGROUND

Wireless communication systems compliant with Third Generation Partnership Project (3GPP) Long Term Evolution (LTE) may support up to 100 Mbps in the downlink (DL), and up to 50 Mbps in the uplink (UL) for a 2×2 configuration. The LTE DL scheme may be based on an Orthogonal Frequency Division Multiple Access (OFDMA) air interface. For the purpose of flexible deployment, wireless communication systems may support scalable transmission bandwidths, which may be one of 1.4, 3, 5, 10, 15 or 20 MHz. Each radio frame (for example, 10 ms) may consist of ten subframes of 1 ms each. Each subframe may consist of two timeslots of 0.5 ms each. There may be either seven or six Orthogonal Frequency Division Multiplexing (OFDM) symbols per timeslot. Seven symbols per timeslot may be used with normal cyclic prefix (CP) length, and six symbols per timeslot may be used with the extended CP length. The sub-carrier spacing for a particular specification is 15 kHz. A reduced sub-carrier spacing mode using 7.5 kHz may also be possible.

A resource element (RE) may correspond to one sub-carrier during one OFDM symbol interval. Twelve consecutive sub-carriers during a 0.5 ms timeslot may constitute one resource block (RB). With seven symbols per timeslot, each RB may consist of 12×7=84 REs. A DL carrier may consist of 6 RBs to 110 RBs which may correspond to an overall scalable transmission bandwidth of roughly 1 MHz to MHz. Each transmission bandwidth, for example, 1.4, 3, 5, 10 or 20 MHz, may correspond to a number of RBs.

The basic time-domain unit for dynamic scheduling may be one subframe consisting of two consecutive timeslots. This may sometimes be referred to as a RB pair. Certain subcarriers on some OFDM symbols may be allocated to carry pilot or reference signals in the time-frequency grid. A number of subcarriers at the edges of the transmission bandwidth may not be transmitted in order to comply with spectral mask requirements.

In single carrier configuration for frequency division duplex (FDD), the network may assign a wireless transmit/receive unit (WTRU) one pair of UL and DL carriers. In single carrier configuration for time division duplex (TDD), the network may assign one carrier which may be time shared for UL and DL. For a given WTRU for any given subframe, there may be a single Hybrid Automatic Repeat reQuest (HARQ) process active for the UL and a single HARQ process active in the DL.

Carrier Aggregation (CA) provides an evolution from single carrier operation that aims to improve data rates using, among other solutions, bandwidth extensions. With CA, the WTRU may simultaneously transmit over the Physical Uplink Shared CHannel (PUSCH) or receive over the Physical Downlink Shared CHannel (PDSCH) of multiple serving cells. For example, in a wireless communication system such as an LTE-Advanced (LTE-A) system, up to four secondary serving cells (SCells) may be used in addition to a Primary serving Cell (PCell), enabling flexible bandwidth assignments up to 100 MHz. Uplink Control Information (UCI), which may consist of HARQ ACK/NACK feedback and/or Channel State Information (CSI), may be transmitted either on Physical Uplink Control CHannel (PUCCH) resources of the PCell or on PUSCH resources available for a serving cell configured for uplink transmissions.

The control information for the scheduling of PDSCH and PUSCH may be transmitted on one or more Physical Downlink Control CHannel(s) (PDCCH) or enhanced PDCCH (EPDCCH). Scheduling for a serving cell may be via a DL control channel on the same serving cell. In addition, when operating with CA, cross-carrier scheduling may also be supported, which may allow the network to use a DL control channel on one serving cell to provide PDSCH assignments and/or PUSCH grants for transmissions in other serving cell(s).

SUMMARY

A method and apparatus for Time Division Duplex (TDD) operation in a wireless transmit/receive unit (WTRU) are disclosed. The method includes receiving a first TDD uplink (UL)/downlink (DL) configuration for a serving cell, receiving a second TDD UL/DL configuration for the serving cell, receiving an indication of directions to use for subframes with conflicting directions between the first TDD UL/DL configuration and the second TDD UL/DL configuration, using the first TDD UL/DL configuration for timing of UL scheduling and UL Hybrid Automatic Repeat Request (HARQ), using the second TDD UL/DL configuration for timing of DL scheduling and DL HARQ, and determining a direction for each subframe with conflicting directions based on the received indication, wherein on a condition that the determined direction for a subframe with conflicting directions is DL, receiving in the subframe in the DL.

DETAILED DESCRIPTION

For a Frequency Division Duplex (FDD) wireless transmit/receive unit (WTRU) operating with carrier aggregation (CA), there may be one Hybrid Automatic Repeat Request (HARQ) entity for each serving cell where each entity may have eight HARQ processes, for example, one per subframe for one round-trip time (RTT). AS a result, there may be more than one HARQ processes active for the UL and for the DL in any given subframe, but at most one uplink (UL) and one downlink (DL) HARQ process per configured serving cell.

A physical random access channel (PRACH) resource may consist of six contiguous physical resource blocks (PRBs). For FDD, PRACH resources may only be time multiplexed, for example, there may be at most one PRACH resource per subframe. For TDD, PRACH resources may additionally be multiplexed in frequency, for example, there may be multiple PRACH resources for a given UL subframe. PRACH resources may be configured for a WTRU from the reception of a PRACH-Config Information Element (IE), which may include a prach-ConfigIndex. The PRACH-Config IE may be received in system information block (SIB)2 on a Broadcast Control Channel (BCCH), for example, for Idle mode WTRUs and for the PCell for Connected mode WTRUs. The PRACH-Config IE may be received in dedicated Radio Resource Control (RRC) protocol data units (PDUs) on PDSCH for a SCell for Connected mode WTRUs. The prach-ConfigIndex may be interpreted differently depending on the frame structure (for example, FDD or TDD). For TDD (which may have frame structure type2), the WTRU may determine the density of the PRACH allocations per radio frame (for example, per 10 ms) using the prach-ConfigIndex. The WTRU may also determine one or more of the following parameters of interest: frequency resource index (for example, index to first PRB of the PRACH resource); whether the PRACH resource is reoccurring in all radio frames, in even frames or in odd frames; whether the PRACH resource is occurring in the first half (for example, first 5 ms) or the second half of the radio frame; and the UL subframe number of the resource, which may be counted from the first UL subframe between two consecutive DL-to-UL switch points. These parameters, together with the TDD UL/DL configuration, may provide the time-frequency location for a specific PRACH resource.

Figure 1:
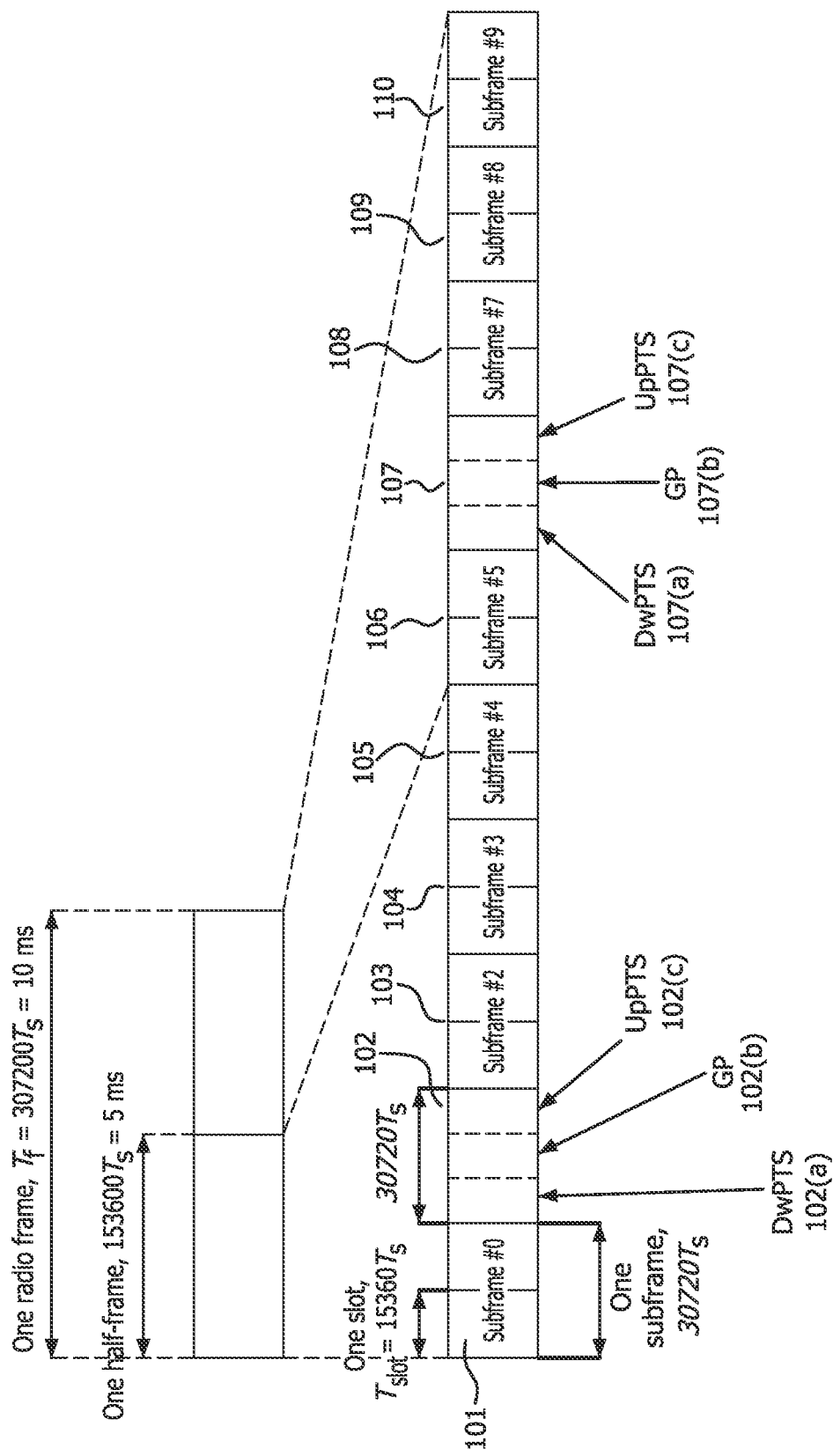
FIG. 1 shows an example of a TDD frame.

In the FDD mode of operation, different carriers may be used for UL and DL transmissions and a full duplex WTRU may simultaneously receive in the DL and transmit in the UL. In the TDD mode of operation, UL and DL transmissions may be performed on the same carrier frequency and may be separated in time. For a given carrier a WTRU may not simultaneously receive in the DL and transmit in the UL. FIG. 1 is an example of a 10 ms TDD frame that consists of 10 subframes of 1 ms each. FIG. 1 includes subframes #0 101 through #9 110. Certain subframes are for DL and others for UL. There are also special subframes which may be used for switching between DL and UL subframes. Examples of special subframes are subframes #1 102 and #6 107. These subframes may have a DL part (DwPTS) 102(a)/107(a), a guard period (GP) 102(b)/107(b), and an UL part (UpPTS) 102(c)/107(c).

Figure 2:
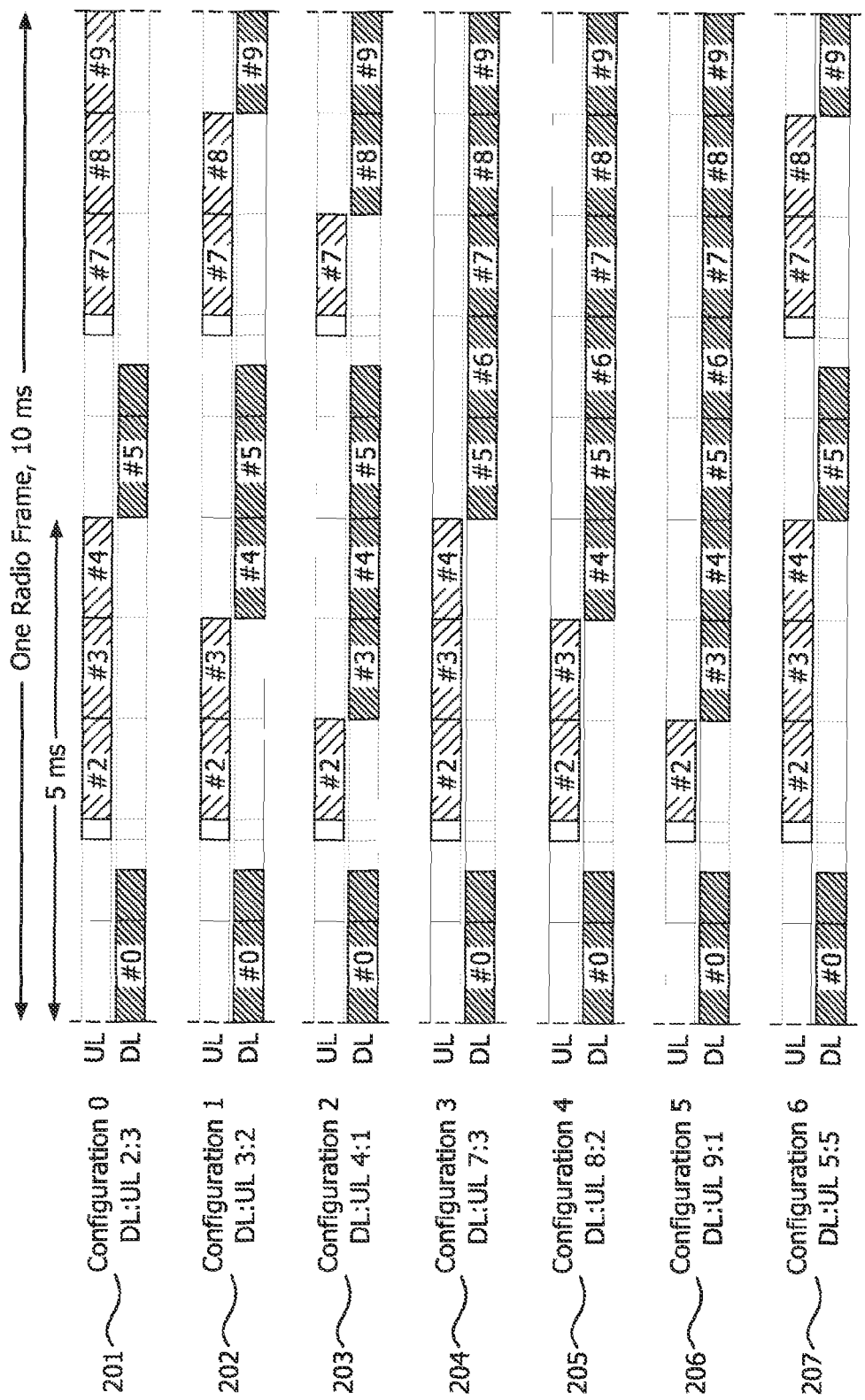
FIG. 2 shows an example of TDD UL/DL configurations in accordance with LTE.

Subframes may be divided between UL and DL according to a TDD UL/DL configuration. FIG. 2 is an example of TDD UL/DL configurations in accordance with LTE. As illustrated in FIG. 2 there are 7 different configurations: configuration 0 201 to configuration 6 207. In each configuration, certain subframes are DL, UL, or special subframes. For the purpose of example, the ratio of DL to UL subframes may be the ratio of the number of DL plus special subframes to the number of UL subframes. In this example, configuration 0 201 has a ratio of DL to UL subframes of 2 to 3. Configuration 1 202 has a ratio of DL to UL subframes of 3 to 2. Configuration 2 203 has a ratio of DL to UL subframes of 4 to 1. Configuration 3 204 has a ratio of DL to UL subframes of 7 to 3. Configuration 4 205 has a ratio of DL to UL subframes of 8 to 2. Configuration 5 206 has a ratio of DL to UL subframes of 9 to 1. Configuration 6 207 has a ratio of DL to UL subframes of 5 to 5.

Table 1 shows the TDD UL/DL configurations along with the UL/DL switching point periodicity of the configurations. Switching from DL subframes to UL subframes which may be accomplished in a special subframe may only happen in subframe 1 or subframes 1 and 6.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 shows examples of special subframe configurations where the same CP length is used in both DL and UL. The values shown for DwPTS, GP, and UpPTS are in OFDM symbols.

TABLE 2

| Special subframe configuration | Normal cyclic prefix in downlink | | | Extended cyclic prefix in downlink | | |
|---|---|---|---|---|---|---|
| | DwPTS | GP | UpPTS Normal cyclic prefix in uplink | DwPTS | GP | UpPTS Extended cyclic prefix in uplink |
| 0 | 3 | 10 | 1 | 3 | 8 | 1 |
| 1 | 9 | 4 | | 8 | 3 | 1 |
| 2 | 10 | 3 | | 9 | 2 | |
| 3 | 11 | 2 | | 10 | 1 | |
| 4 | 12 | 1 | | 3 | 7 | 2 |
| 5 | 3 | 9 | 2 | 8 | 2 | |
| 6 | 9 | 3 | | 9 | 1 | |
| 7 | 10 | 2 | | 5 | 5 | |
| 8 | 11 | 1 | | — | — | |
| 9 | 6 | 6 | | — | — | |

According to Table 2, in the normal CP case, the GP may be 1, 2, 3, 4, 6, 9 and 10 OFDM symbols long. In the extended CP case, the GP may be 1, 2, 3, 5, 7 and 8 OFDM symbols long. A special subframe may have at least one OFDM symbol for UpPTS. The DL part (DwPTS) may be treated as a normal but shortened DL subframe which may carry DL control signals (for example, one or more of PDCCH, EPDCCH, Physical Control Format Indicator Channel (PCFICH), Physical Hybrid-ARQ Indicator Channel (PHICH)) and possibly DL data, for example PDSCH. The special subframe UL part may carry sounding reference signal (SRS) or Random Access requests. Special subframes may sometimes be treated as DL subframes.

Figure 3A:
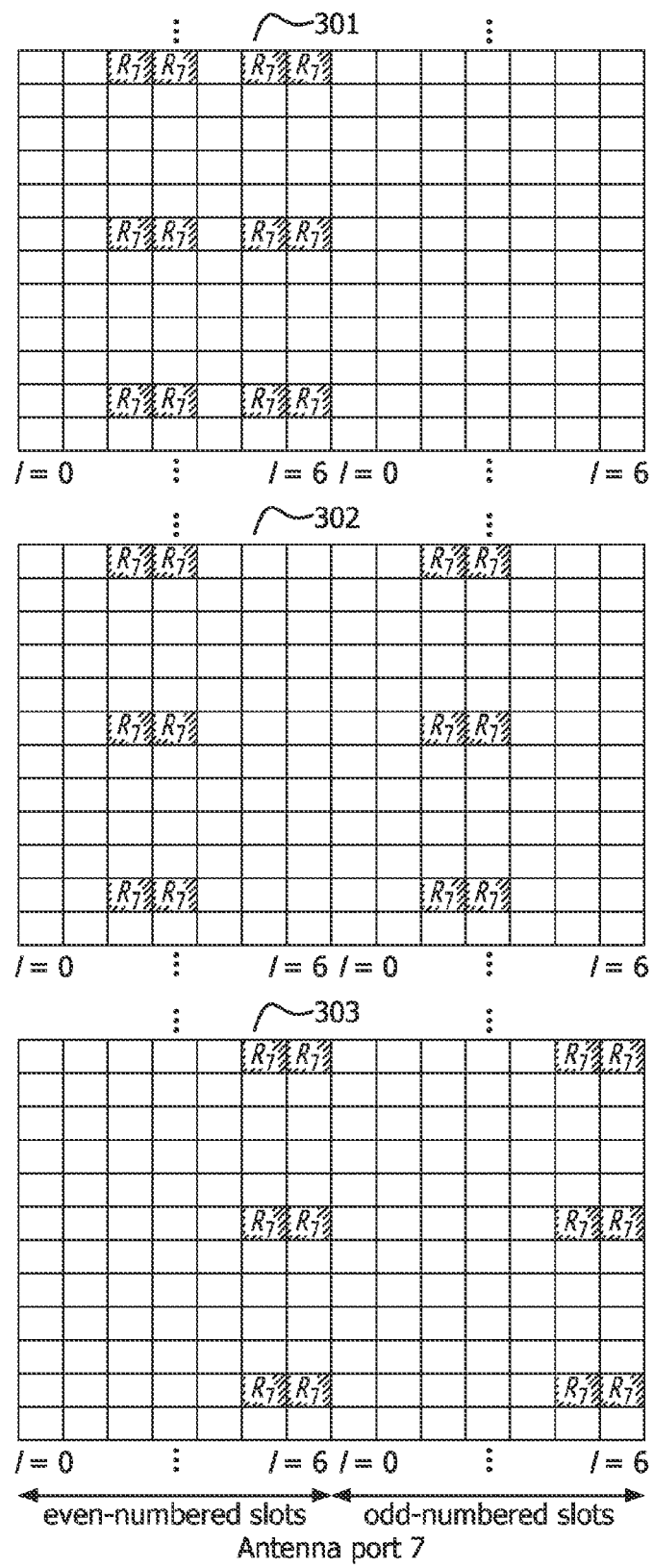
FIGS. 3A-3F show examples of RE locations which may also be called patterns of WTRU-specific reference signals, DM-RS patterns or DMRS patterns.
Figure 3B:
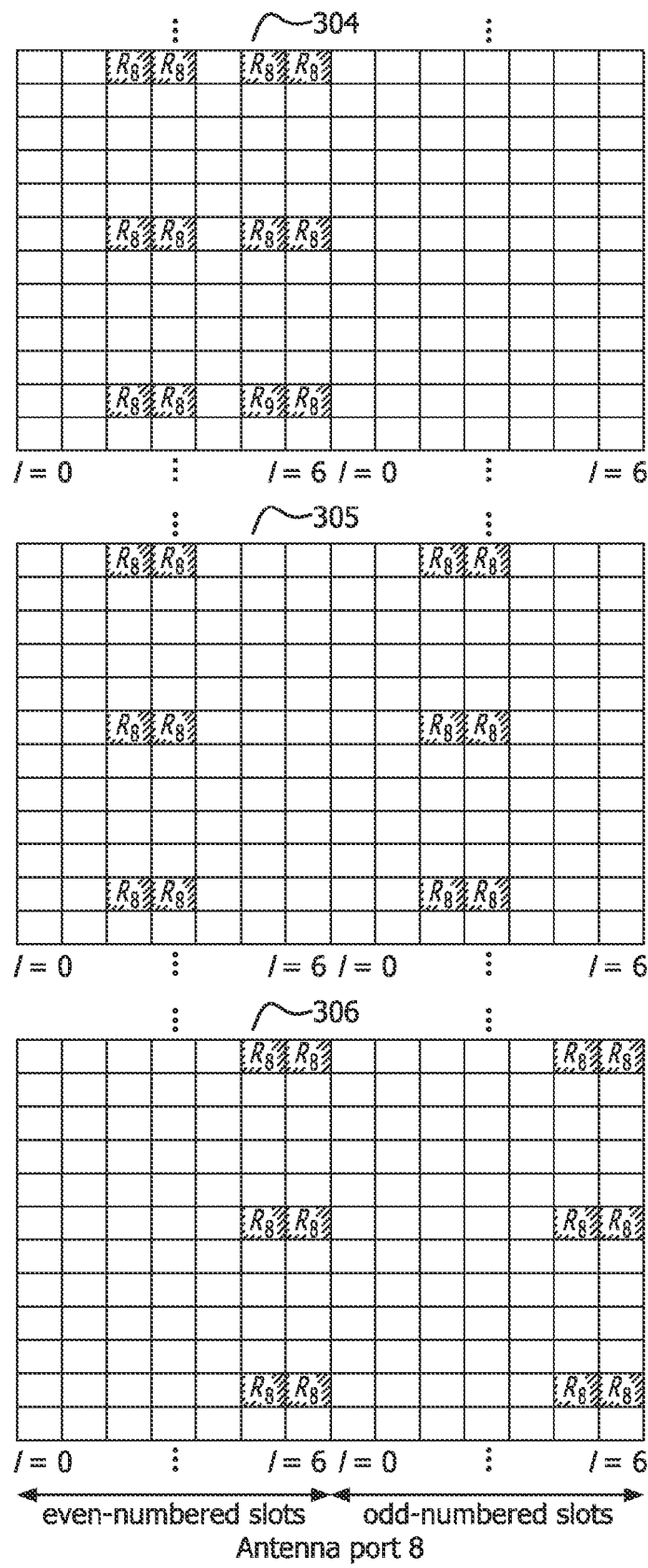
Figure 3C:
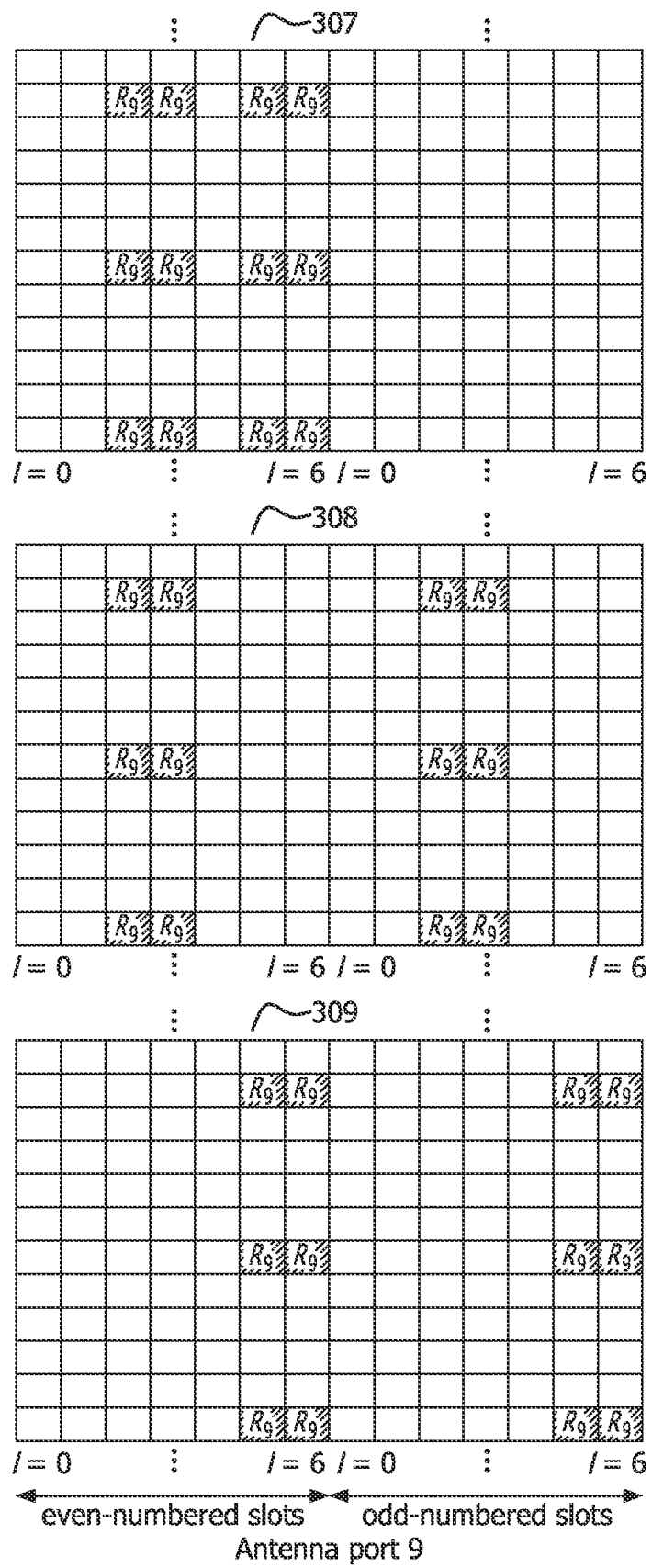
Figure 3D:
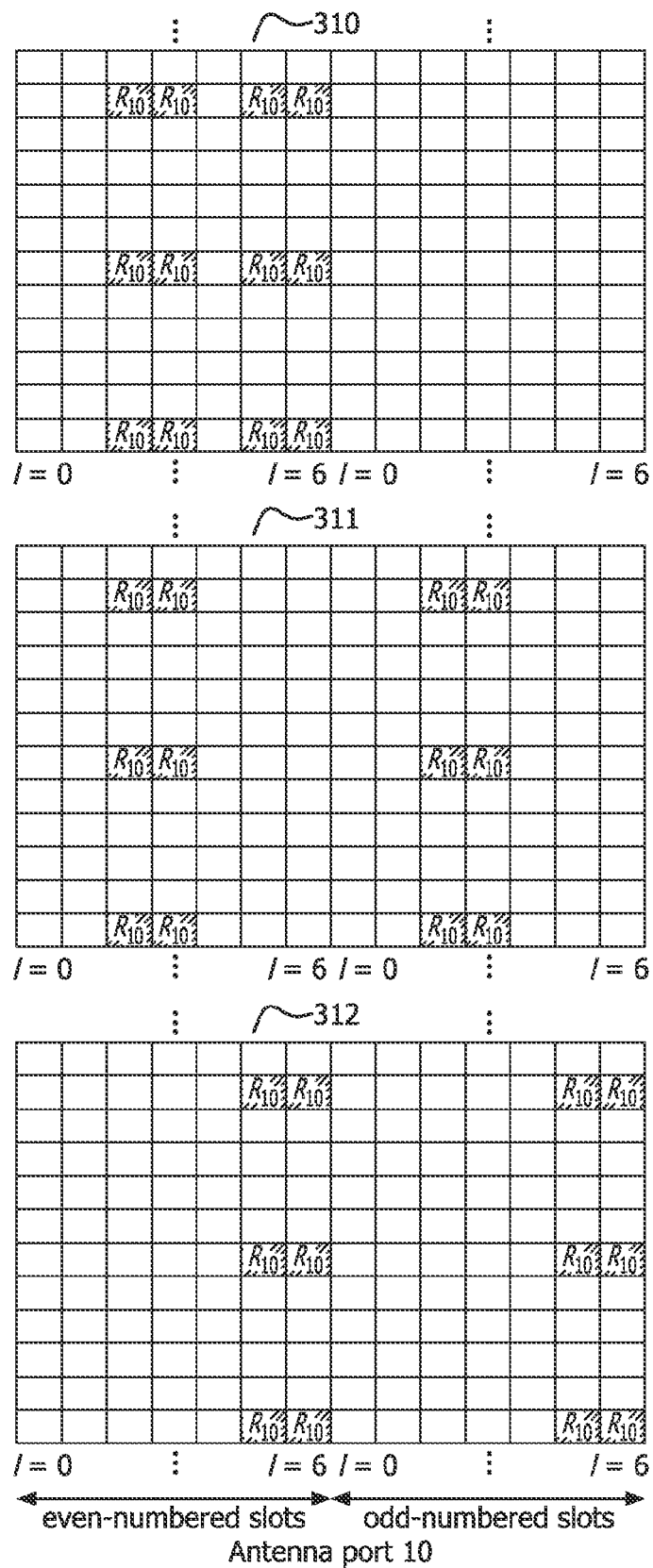
Figure 3E:
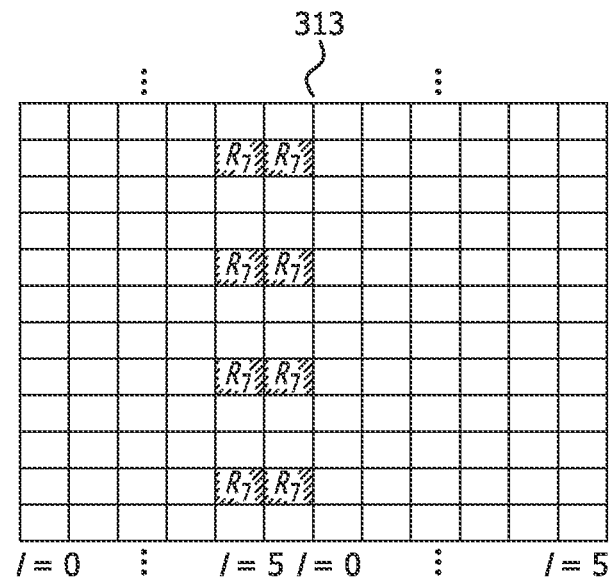
Figure 3E:
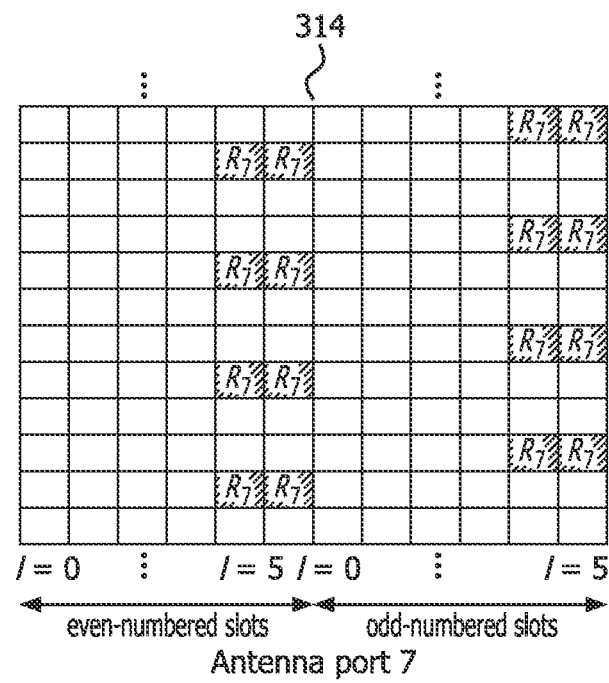
Figure 3F:
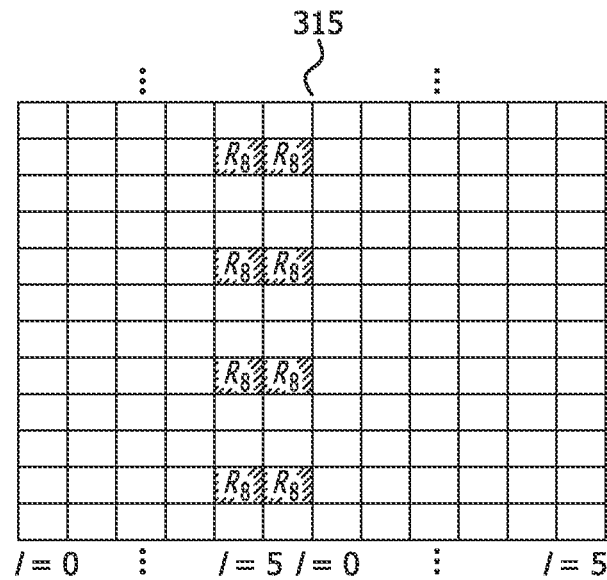
Figure 3F:
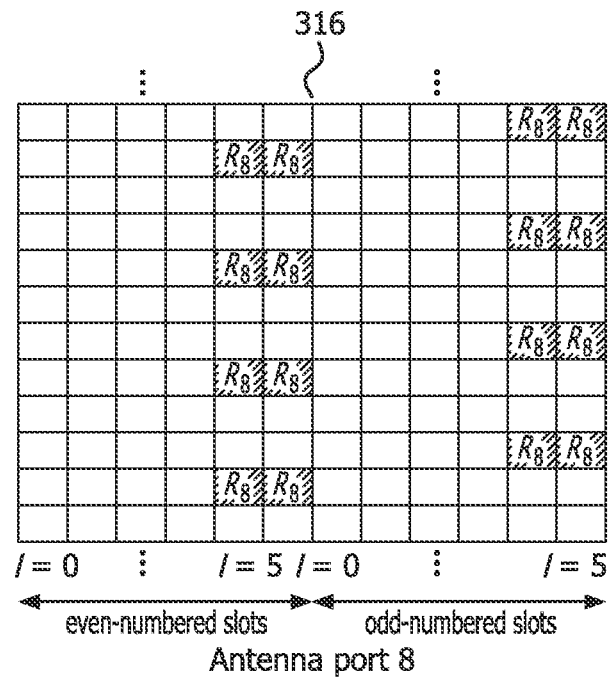

FIGS. 3A-3F show examples of RE locations which may also be called patterns of WTRU-specific reference signals, DM-RS patterns or DMRS patterns. FIGS. 3A-3D show examples for normal CP where FIG. 3A shows examples for antenna port 7, FIG. 3B shows examples for antenna port 8, FIG. 3C shows examples for antenna port 9, and FIG. 3D shows examples for antenna port 10. FIGS. 3E and 3F show examples for antenna ports 7 and 8, respectively, for extended CP. In a special subframe, special DM-RS patterns may be defined such that the reference signals may be located in the DwPTS region of the subframe, as shown in FIG. 3A-3C for some special subframe configurations. These special patterns may be applicable to certain transmission modes (TM) such as TM 8 and 9 which may use DM-RS. For other transmission modes in a special subframe no special DM-RS patterns may be defined. Though not shown, special DM-RS patterns may be applicable to special subframes for other antenna ports for normal CP, for example antenna ports 11-14.

FIG. 3A illustrates DM-RS patterns for antenna port 7 for special subframe configurations 1, 2, 6, and 7 301, DM-RS patterns for special subframe configurations 3, 4, 8, and 9 302, and DM-RS patterns for all other downlink subframes 303. FIG. 3B illustrates DM-RS patterns for antenna port 8 for special subframe configurations 1, 2, 6, and 7 304, DM-RS patterns for special subframe configurations 3, 4, 8, and 9 305, and DM-RS patterns for all other downlink subframes 306.

FIG. 3C illustrates DM-RS patterns for antenna port 9 for special subframe configurations 1, 2, 6, and 7 307, DM-RS patterns for special subframe configurations 3, 4, 8, and 9 308, and DM-RS patterns for all other downlink subframes 309. FIG. 3D illustrates DM-RS patterns for antenna port 10 for special subframe configurations 1, 2, 6, and 7 310, DM-RS patterns for special subframe configurations 3, 4, 8, and 9 311, and DM-RS patterns for all other downlink subframes 312.

FIG. 3E illustrates DM-RS patterns for antenna port 7 for special subframe configurations 1, 2, 3, 5, and 6 313 and DM-RS patterns for all other downlink subframes 314. FIG. 3F illustrates DM-RS patterns for antenna port 8 for special subframe configurations 1, 2, 3, 5, and 6 315 and DM-RS patterns for all other downlink subframes 316.

To avoid generating severe interference on the neighboring cells, the same TDD UL/DL configuration may be used for neighboring cells. Since change of configuration may disrupt connections, the configuration may not change often and may be considered static or semi-static.

The number of the TDD UL and DL HARQ processes may depend on the TDD UL/DL configuration.

In some LTE implementations, intra-band carrier aggregation may be supported and aggregated carriers for TDD may have the same TDD UL/DL configurations.

In FDD, the subframes {0, 4, 5, 9} may not be configured as MBSFN subframes, whereas in TDD, the subframes {0, 1, 2, 5, 6} may not be configured as MBSFN subframes TDD DL scheduling timing may be the same as that of FDD. For example, the WTRU may receive a scheduling grant for a DL transmission in the same subframe as the DL transmission. TDD DL HARQ protocol may be asynchronous and adaptive, which may mean that there may always be a PDCCH (or EPDCCH) carrying a DL grant for every DL re-transmission.

Considering the UL scheduling and re-transmission timing for TDD UL/DL configurations 1-6, upon detection by a WTRU of a PDCCH (or EPDCCH) in subframe n with downlink control information (DCI) format with uplink grant intended for the WTRU and/or a PHICH transmission intended for the WTRU, the WTRU may adjust the corresponding PUSCH transmission in subframe n+k, with k given in Table 3, according to the PDCCH (or EPDCCH) and PHICH information.

For TDD UL/DL configuration 0, upon detection by a WTRU in subframe n of a PDCCH (or EPDCCH) with DCI format with uplink grant (which may be called UL DCI format) intended for the WTRU and/or a PHICH transmission intended for that WTRU, the WTRU may adjust the corresponding PUSCH transmission in subframe n+k if the most significant bit (MSB) of the UL index in the PDCCH with uplink DCI format is set to 1 or if PHICH is received in subframe n=0 or 5 in the resource corresponding to $I_{PHICH}=0$, with k given in Table 3, where $I_{PHICH}$ may equal 1 for TDD UL/DL configuration 0 with PUSCH transmission in subframe n=4 or 9, and $I_{PHICH}$ may equal 0, otherwise.

If, for TDD UL/DL configuration 0, the least significant bit (LSB) of the UL index in the DCI format, which may be an UL DCI format such as format 0 or 4, is set to 1 in subframe n or if a PHICH is received in subframe n=0 or 5 in the resource corresponding to $I_{PHICH}=1$, or if PHICH is received in subframe n=1 or 6, the WTRU may adjust the corresponding PUSCH transmission in subframe n+7. If, for TDD UL/DL configuration 0, both the MSB and LSB of the UL index in the PDCCH with uplink DCI format are set in subframe n, the WTRU may adjust the corresponding PUSCH transmission in both subframes n+k and n+7, with k given in Table 3. Table 3 is an example of UL scheduling timing k for TDD configuration 0-6.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

As an example, for configuration 1, if an UL grant is received in the DL in subframe n=1, then from the table, k=6 and the grant is for a PUSCH in subframe n+k=1+6=7.

In TDD, the DL HARQ timing mechanism may be based on a concept of a bundling window which consists of a set of DL subframes. The DL HARQ feedback bits corresponding to these DL subframes may be bundled together and transmitted to the eNB in the same UL subframe either via a PUCCH or a PUSCH. An UL subframe n may carry the DL HARQ feedback bits for M DL subframes where M>=1.

Table 4 is an example of a DL association set index K: $\{k_0, k_1, \ldots k_{M-1}\}$ for TDD DL HARQ. Referring to Table 4, UL subframe n may carry the DL HARQ feedback bits of each DL subframe n-k, where k∈K and K is a set of M elements $\{k_0, k_1, \ldots k_{M-1}\}$. M may be considered as the size of the bundling window in terms of DL subframes.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As an example, for configuration 1, UL subframe n=2 carries the DL HARQ feedback bits for the 2 subframes n-k where k=7 and k=6 which correspond to 2-7 and 2-6. Since the frames are 10 subframes each, this corresponds to subframes 5 and 6 in the previous frame.

The physical resources which may be used for PUCCH may depend on two parameters, $N_{RB}^{(2)}$ and $N_{cs}^{(1)}$, which may be given by higher layers. The variable $N_{RB}^{(2)} \geq 0$ may denote the bandwidth in terms of RBs that may be available for transmission of certain PUCCH formats, such as formats 2/2a/2b, in each slot. The variable $N_{cs}^{(1)}$ may denote the number of cyclic shifts which may be used for certain PUCCH formats such as 1/1a/1b in a RB which may be used for a mix of formats such as 1/1a/1b and 2/2a/2b. Resources which may be used for transmission of PUCCH formats such as 1/1a/1b, 2/2a/2b and 3 may be represented by the non-negative indices $$n_{PUCCH}^{(1,p)}, n_{PUCCH}^{(2,p)} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2)$$

and $n_{PUCCH}^{(3,p)}$, respectively.

Table 5 is an example of kPHICH for TDD. For PUSCH transmissions scheduled from a scheduling cell in subframe n, the WTRU may determine the corresponding PHICH resource of that scheduling cell to be in subframe n+kPHICH, where kPHICH is given in Table 5. For subframe bundling operation, the corresponding PHICH resource may be associated with the last subframe in the bundle.

TABLE 5

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

As an example, for configuration 1, if the WTRU transmits a PUSCH in subframe n=2, then it may expect a PHICH providing the UL HARQ-ACK feedback in subframe n+kPHICH, which from the table is 4, so the WTRU may expect the PHICH in subframe 2+4=6.

The PHICH resource may be identified by the index pair $(n_{PHICH}^{group}, n_{PHICH}^{seq})$ where $n_{PHICH}^{group}$ may be the PHICH group number and $n_{PHICH}^{seq}$ may be the orthogonal sequence index within the group and the following may apply:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

Equation 1 where $n_{DMRS}$ may be mapped from the cyclic shift for DMRS field in the most recent PDCCH with uplink DCI format for the transport block(s) associated with the corresponding PUSCH transmission. $n_{DMRS}$ may be set to zero for some scenarios where there is no PDCCH with uplink DCI format for the same transport block. The $N_{SF}^{PHICH}$ may be the spreading factor size used for PHICH modulation. The $I_{PRB\_RA}$ may be as shown below:

$$I_{PRB\_RA} = \begin{cases} I_{PRB\_RA}^{lowest\_index} & \text{for the first } TB \text{ of a } PUSCH \\ & \text{with associated } PDCCH \text{ or for the case} \\ & \text{of no associated } PDCCH \text{ when the number of} \\ & \text{negatively acknowledged } TBs \text{ is not equal to the number} \\ & \text{of } TBs \text{ indicated in the most recent } PDCCH \\ & \text{associated with the } correspondng \text{ } PUSCH \\ I_{PRB\_RA}^{lowest\_index} + 1 & \text{for a second } TB \text{ of a } PUSCH \text{ with associated } PDCCH \end{cases}$$

Equation 2 where $I_{PRB\_RA}^{lowest\_index}$ may be the lowest PRB index in the first slot of the corresponding PUSCH transmission. The $N_{PHICH}^{group}$ may be the number of PHICH groups configured by higher layers.

With respect to Idle mode operation, cell detection and selection of a suitable TDD cell may be independent of TDD UL/DL configuration until SIB1 is read by the WTRU. Primary Synchronization Signal (PSS), Secondary Synchronization Signal (SSS), Physical Broadcast Channel (PBCH), which may carry the Master Information Block (MIB), and SIB1 may be transmitted in predetermined subframes, for example, subframes 0 and 5 which may be DL regardless of the TDD UL/DL configuration. Along with information used to determine suitability of the cell for normal operations, the WTRU may not obtain knowledge of the TDD UL/DL configuration of a cell until it has read SIB1.

In Idle mode, the WTRU may perform measurements on the current serving cell on which it has camped and of neighboring cells on both the same carrier frequency, for example, intra-frequency neighbor cell measurements, and different carrier frequencies, for example inter-frequency neighbor cell measurements.

The serving eNodeB (eNB) may provide information concerning measurements for neighbor cells in its system broadcast information, as well as dedicated measurement priority information through dedicated RRC signaling. The WTRU may also detect and measure cells that are not part of a provided cell list. To, for example, limit the amount of measurements that a WTRU may need to perform and to, for example, minimize battery consumption during its Discontinuous Reception (DRX) cycle; the WTRU may have the following conditions for measuring inter-frequency and intra-frequency neighbors which may be based on carrier specified frequency priorities. For frequencies assigned higher priority than the current frequency, the WTRU may perform inter-frequency measurements on cells in that higher priority frequency. For frequencies assigned priority equal or lower than the current frequency and for the current frequency, the WTRU may perform inter-frequency measurements and/or intra-frequency measurements once the Reference Signal Received Power (RSRP) and/or Reference Signal Received Quality (RSRQ) of the current cell falls below a specified threshold.

The measurements of neighbor cells may be monitored and evaluated in Idle mode such that a WTRU may decide to perform cell re-selection to another cell when the cell re-selection criteria is met based on system information specified thresholds.

In order for a WTRU to be reached by the network while it is in Idle mode, the network may use a paging message. The information contained within the paging message may be WTRU specific, for example, to establish a connection to the network, or may include general indicators for example to notify WTRUs of changes to certain broadcast information of the cell which may include Earthquake and Tsunami Warning System (ETWS) and Commercial Mobile Alert Service (CMAS) information. In order, for example, to minimize the amount of time a WTRU may need to look for a possible page, a DRX cycle and paging occasions may be assigned to the WTRU through cell system information and/or through higher layer specified parameters. For TDD, depending on the number of paging resources needed in the cell, paging information may be transmitted in one or more of subframes {0, 1, 5, 6} on PDSCH whose resource location is transmitted on PDCCH which may be masked with Paging Radio Network Temporary Identifier (P-RNTI). Since there may be a single P-RNTI assigned in a cell, a single paging message may be transmitted on the pre-assigned subframes. In Idle mode, a WTRU may look for pages only in subframes corresponding to its paging occasions and a WTRU's paging occasions may only correspond to one of the subframes {0, 1, 5, 6}. In Connected mode, a WTRU may be paged in certain circumstances such as in the event of a SIB change. In this case, a WTRU may look for pages in any subframe which may include pages.

In Connected mode, similar to Idle mode, a WTRU may perform measurements on serving and neighbor cells. The measurements in Connected mode may be configured by dedicated RRC signaling. Reporting of measurement results may also be configured for the WTRU. Transmission of measurement reports by the WTRU may be periodic or event triggered. The results may, for example, be used by the eNB for the purpose of radio resource management such as for handover decisions and/or for radio link monitoring by the WTRU.

Handover may be a network based procedure in which a WTRU in connected mode is commanded to move from a source cell to a target cell. The procedure may be WTRU assisted, for example, by measurement reports. The source cell and target cell may prepare for the handover before the WTRU is commanded to handover to the target cell. To execute the handover, the WTRU may attempt to synchronize with the target cell based on information provided by the source cell regarding the target cell, for example, in a mobilityControlInfo IE, which may include resource information for common channels, which may be information also provided in SIBs, dedicated resource information for transfer of Enhanced Packet System (EPS) bearers, and dedicated RACH information for pre-allocated random access resources which may have no contention with other WTRUs.

If the WTRU detects radio link failure during synchronization with the target cell or the timer for the handover procedure, for example Timer 304 (T304), expires, the WTRU may attempt to re-establish a connection back to the source cell using previous configurations prior to the handover.

Semi-persistent scheduling (SPS) may be a procedure in which a WTRU may be allocated periodic DL or UL resources without the explicit scheduling of the DL or grant of UL resources via PDCCH. A typical use for SPS is a service such as Voice over Internet Protocol (VoIP). SPS configuration may be transmitted to the WTRU via RRC signaling, for example as part of dedicated resource configuration. The exact subframe in which SPS is activated may be provided by a DL grant via PDCCH and may be masked with SPS Cell-RNTI (C-RNTI) which may be specified in the RRC configuration message. The release of the SPS configuration may also be signaled by the network via PDCCH signaling. Additionally, for UL SPS, the WTRU may implicitly release the SPS configuration if there has been no data to transmit for SPS based allocations for a certain number of subframes.

For TDD, there may be a parameter in the UL SPS configuration, for example, twoIntervalsConfig, which if set to TRUE may configure the UL SPS with a subframe offset which is TDD UL/DL configuration dependent.

DRX in Connected mode may allow WTRUs to utilize periods of inactivity to limit battery consumption. Timers which may be configured by the network such as via RRC signaling may define the active time for a WTRU. An OnDurationTimer may specify the number of consecutive PDCCH-subframe(s) at the beginning of a DRX Cycle. A DRX-InactivityTimer may specify the number of consecutive PDCCH-subframe(s) after successfully decoding a PDCCH indicating an initial UL or DL user data transmission for this WTRU. A DRX-RetransmissionTimer may specify the maximum number of consecutive PDCCH-subframe(s) for as soon as a DL retransmission is expected by the WTRU.

The above three timers may indicate a possibility of PDCCH for a WTRU and may indicate to that WTRU a need to remain active during the running of those timers. PDCCH subframes in TDD may represent the DL subframes (which may include special subframes) in which a WTRU may receive PDCCH (or EPDCCH), regardless of whether an actual PDCCH (or EPDCCH) has been received by the WTRU. Additionally, there may be short and long DRX cycles which may also be defined by the network as part of the DRX configuration for the WTRU.

Figure 4A:
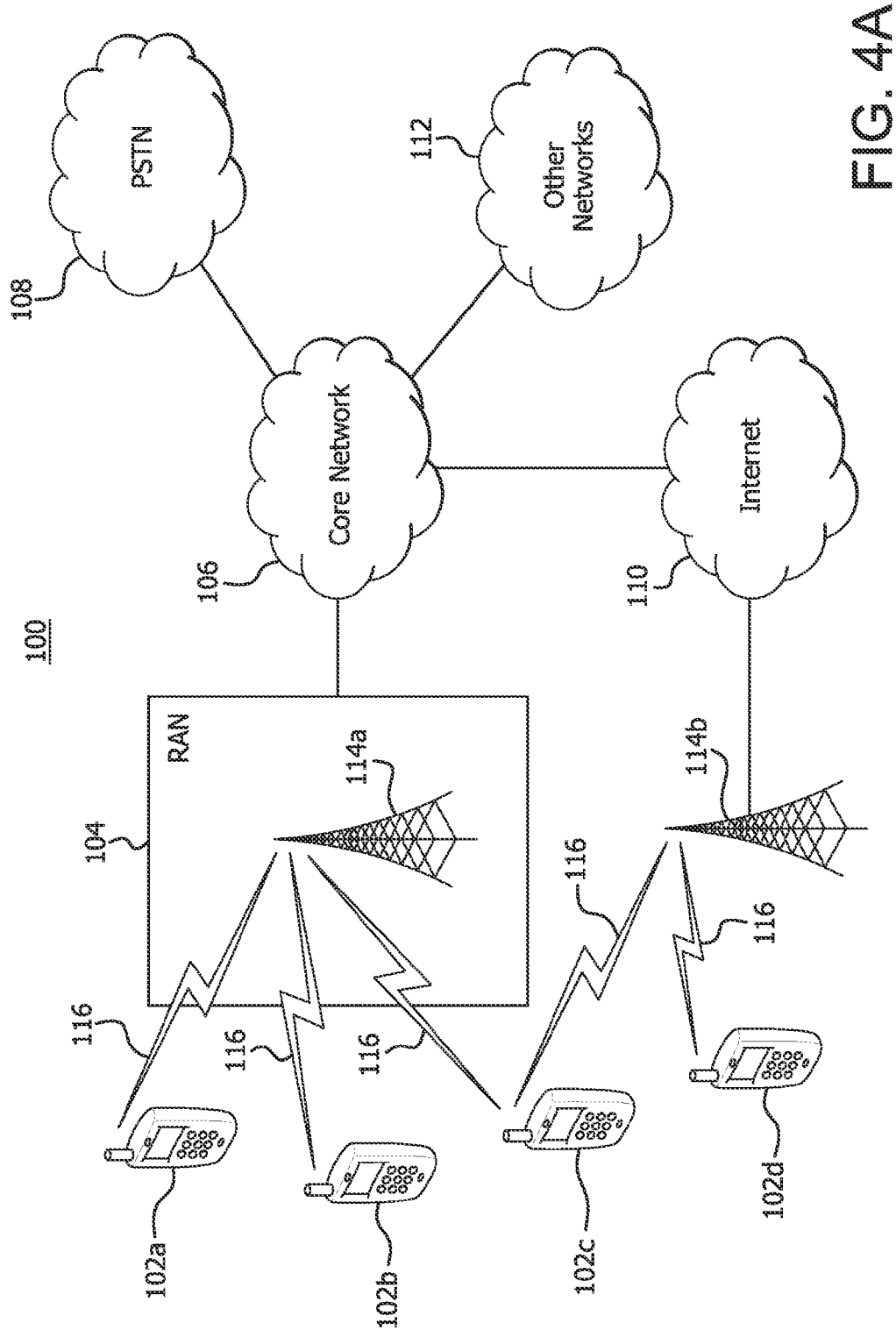
FIG. 4A is a system diagram of an example communications system in which one or more disclosed embodiments may be implemented.

FIG. 4A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 4A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 4A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 4A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 4A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 4A may be configured to communicate with the base station 114a, which may employ a cellular-based radio technology, and with the base station 114b, which may employ an IEEE 802 radio technology.

Figure 4B:
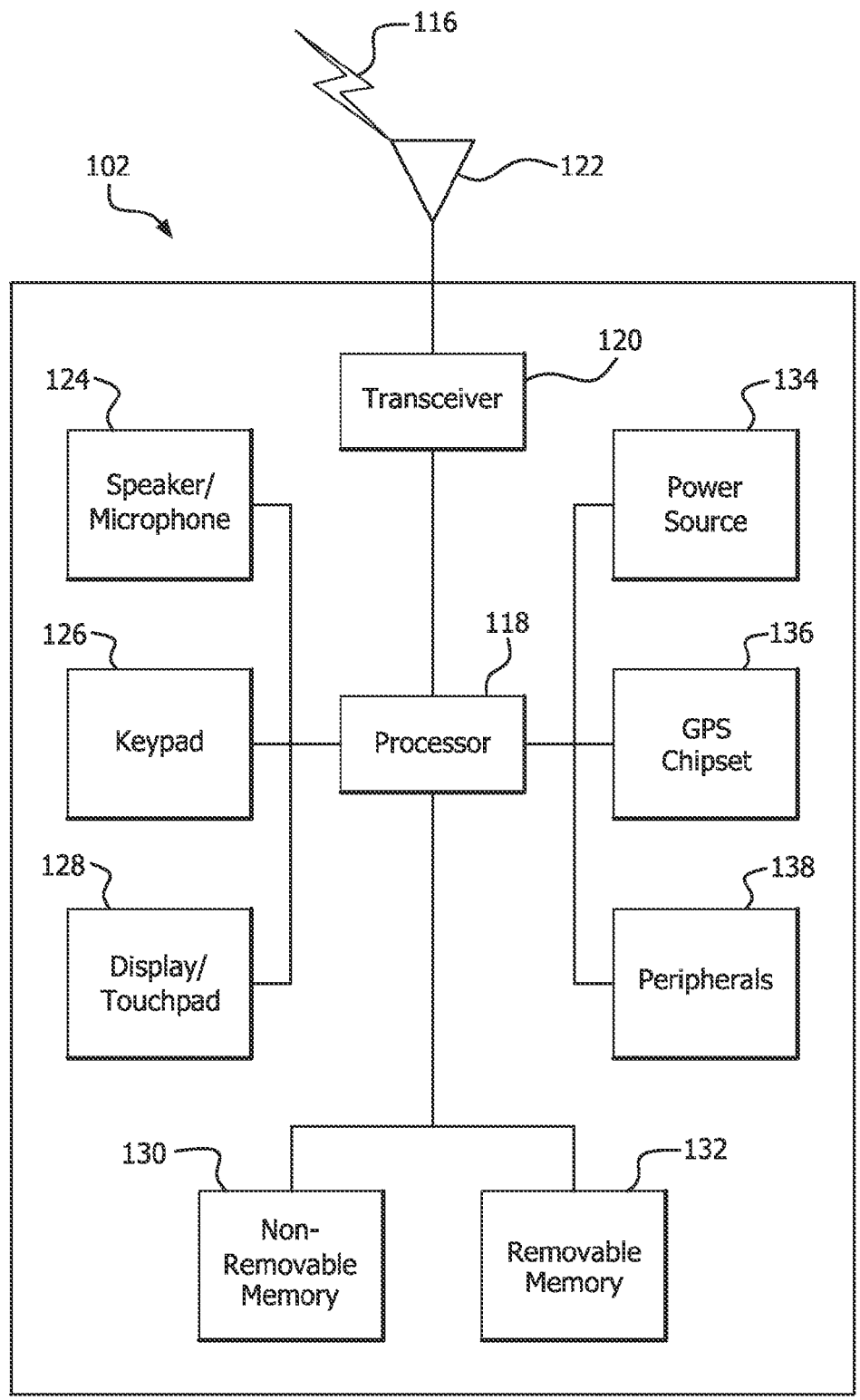
FIG. 4B is a system diagram of an example wireless transmit/receive unit (WTRU) that may be used within the communications system illustrated in FIG. 4A.

FIG. 4B is a system diagram of an example WTRU 102. As shown in FIG. 4B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 4B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 4B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 4C:
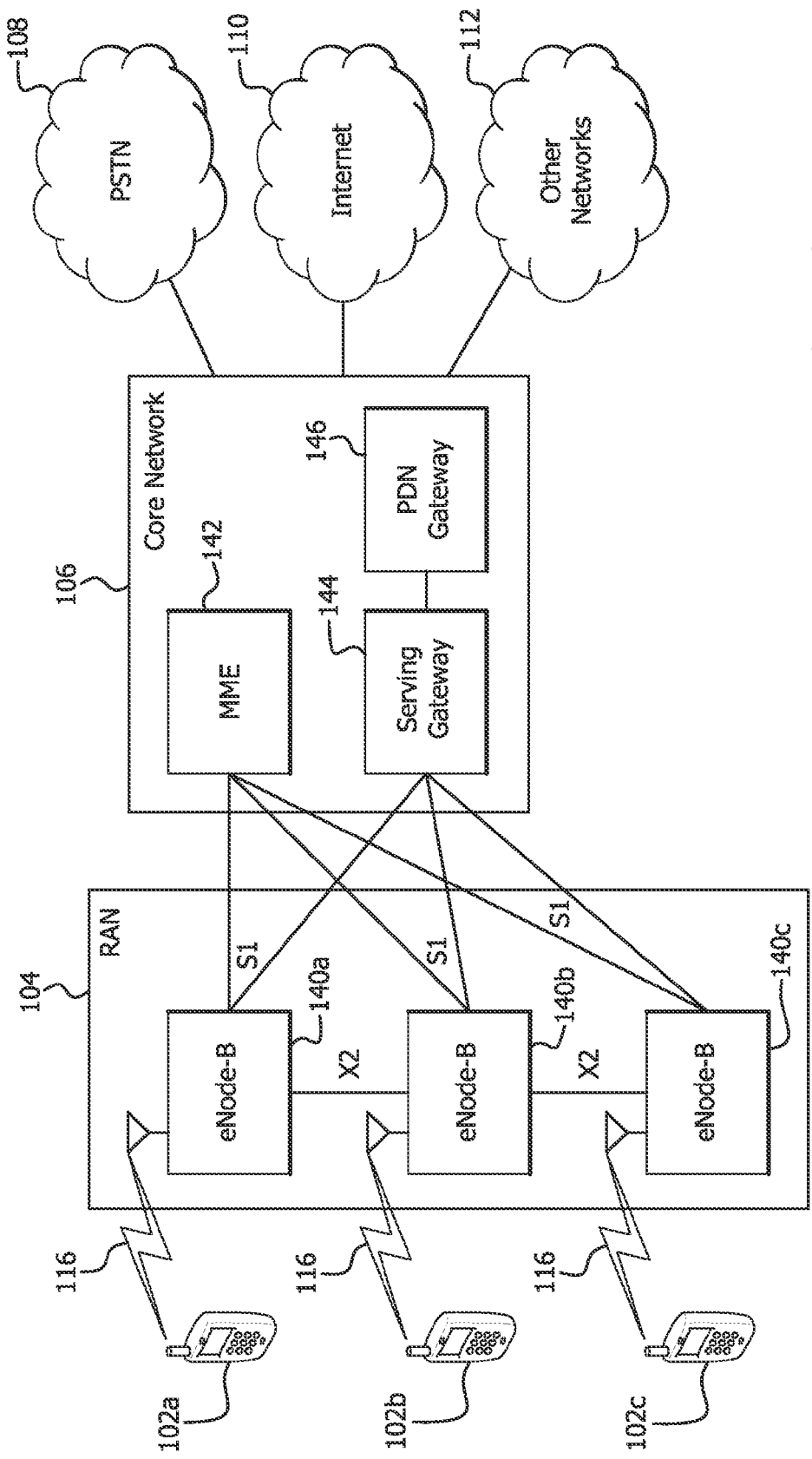
FIG. 4C is a system diagram of an example radio access network and an example core network that may be used within the communications system illustrated in FIG. 4A.

FIG. 4C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 4C, the eNode-Bs 140a, 140b, 140c may communicate with one another over an X2 interface.

The core network 106 shown in FIG. 4C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A TDD UL/DL configuration in a cell may provide a certain ratio of UL and DL subframes which may, for example, optimally, match the needs of the WTRUs being served at a certain time. When traffic may change, it may be desirable to change the DL to UL subframe ratio to better serve the WTRUs. A means to provide fast switching of the DL to UL ratio or the TDD UL/DL configuration for WTRUs which may support fast switching while minimizing the impact to WTRUs which may not support fast switching may be useful.

Herein, WTRU-specific may mean specific to a WTRU or group of WTRUs. WTRU-specific signaling or configuration, may mean that such signaling or configuration may be provided to or for a WTRU or group of WTRUs and such signaling or configuration may not be provided by cell broadcast or may not be provided in a system information block (SIB) such as SIB1. WTRU-specific and dedicated may be used interchangeably.

Cell-specific information or configuration may mean information or configuration that may be provided to, provided for, received by, intended to be received by or intended to be used by all WTRUs in the cell and/or information or configuration that may be provided by system information such as in one or more SIBs or by broadcast signaling.

The terms dynamic TDD cell and dynamic TDD capable cell may be used to refer to a cell which may support dynamic reconfiguration of its TDD UL/DL configuration, also referred to herein as dynamic TDD reconfiguration. Dynamic TDD reconfiguration may mean that the reconfiguration may be performed using a means other than changing the UL/DL configuration which may be indicated in cell broadcast signaling and/or a SIB such as SIB1 which may, for example, be changed via an existing system information modification procedure such as an LTE system information modification procedure.

The terms TDD UL/DL configuration and UL/DL configuration may be used interchangeably. TDD may be used herein as an example and is not intended to limit the applicability of the embodiments.

The terms network, network node, eNB, and cell may be used interchangeably. Component carrier and serving cell may be used interchangeably.

PDCCH may include or may be used to represent PDCCH and/or EPDCCH. Assignment, grant, and allocation may be used interchangeably.

The terms semi-static TDD cell, non-dynamic TDD cell, and non-dynamic TDD capable cell may be used to refer to a cell which may or may only reconfigure its UL/DL configuration by changing the UL/DL configuration indicated in cell broadcast signaling and/or a SIB such as SIB1, for example via an existing system information modification procedure such as an LTE system information modification procedure.

Legacy WTRUs may refer to WTRUs which may not support certain functionality such as WTRUs which may support TDD but which may not support dynamic TDD reconfiguration. Legacy WTRUs may refer to WTRUs which may not support certain functionality such as WTRUs which may support an UL/DL configuration but which may not support dynamic reconfiguration of that UL/DL configuration. Legacy WTRUs may refer to WTRUs which may comply with certain releases or versions such as 3GPP or LTE standards releases or versions. For example WTRUs which may comply with 3GPP or LTE standards releases which may be no later than a certain release such as Release 11 may be considered legacy WTRUs. Dynamic TDD WTRUs may refer to WTRUs supporting dynamic TDD reconfiguration. The methods, procedures, and embodiments defined herein with respect to UL/DL subframe directions may be applied to WTRU-specific and/or procedure-specific TDD UL/DL configurations and vice versa.

The following description relates measurements, for example Idle Mode and/or Connected mode measurements. Since a WTRU's serving and neighbor cells may have different UL/DL configurations and those configurations may change, a WTRU may need additional information to enable it to properly detect and measure the neighbor cells and/or avoid unnecessary power consuming operations such as making measurements in a neighbor's UL subframes. For example, the WTRU may need the UL/DL configuration of one or more neighbor cells.

A WTRU may be provided with information regarding DL subframes to use for the purpose of serving and/or neighbor cell measurements, for example in order for the WTRU to accurately and/or efficiently measure the RSRP and/or RSRQ of the serving and/or neighbor cells. This information may be provided to the WTRU, for example by the eNB, and/or determined by the WTRU in one or more of the following ways.

A WTRU may use the DL subframes indicated in a TDD UL/DL configuration, such as the TDD UL/DL configuration which may be provided by broadcast signaling such as in a SIB such as SIB1, as the reference for DL subframes it may use for the purpose of serving and/or neighbor cell measurements.

A WTRU may receive an UL/DL configuration, for example from an eNB, which may be at least or specifically for serving and/or neighbor cell measurements. This indicated configuration may or may not be different from the configuration in the cell broadcasted, for example, SIB1, UL/DL configuration. The WTRU may use any DL subframe in the measurement UL/DL configuration for the purpose of serving and/or neighbor cell measurements. The WTRU may expect the DL signals needed for measurements to be present in those subframes, for example, a cell-specific reference signal (CRS), for at least serving cell measurements.

A WTRU may receive a subframe pattern, for example from an eNB, which may specifically indicate the DL subframes that may be used to measure the serving and/or neighbor cells. In the DL subframes indicated as "measurable" subframes, the WTRU may expect the DL signals needed for measurements to be present for at least serving cell measurements. The other subframes, for example, non-measurable subframes, may at some times be DL subframes but may change due to the dynamic TDD reconfiguration of the cell.

A WTRU may determine the subframes it may use for serving and/or neighbor cell measurements without an indication from the network, for example based on the subframes which may be predefined as or known to be DL and/or special subframes. As an example, TDD configurations may be defined with two subframes that are consistently DL subframes for all configurations, such as subframes 0 and 5, one subframe which is always a special subframe, such as subframe 1, and one subframe which, based on the UL/DL configuration, may be a DL or special subframe, such as subframe 6. In this example, subframes {0, 1, 5, 6} may have opportunities, either in the entire or partial subframe, to have CRS transmitted from the cell. A WTRU may determine for itself whether to use all or a subset of these subframes to perform cell measurements.

A WTRU may receive, for example from an eNB, DL subframe information or UL/DL configuration, such as described above, for each of one or more neighbor cells or groups of neighbor cells, for example, for the purpose of neighbor cell measurements. This information may be received by the WTRU as part of system information, which may be transmitted by the eNB such as by broadcast, for example, for intra-frequency and/or inter-frequency measurement and/or cell reselection information, for example, in one or more of SIB3, SIB4, SIB5, and/or SIB6. The information may also or instead be provided as dedicated information specifically intended for and/or received by the WTRU. In this case, the dedicated information may supersede information received through cell broadcasted system information. A received neighbor cell set of DL subframes, subframe pattern or UL/DL configuration may have one or more of the following scopes. A set of DL subframes, a subframe pattern or an UL/DL configuration may be specific to a neighbor cell and may be provided in the intra-frequency or inter-frequency neighbor cell list. A set of DL subframes, subframe pattern or UL/DL configuration may be specific to a set of neighbor cells belonging to the same carrier frequency. A set of DL subframes, subframe pattern or UL/DL configuration may be applicable to all cells that may autonomously be detected by the WTRU and may not be included in the intra-frequency or inter-frequency neighbor cell lists. This information may apply as a default set of DL subframes for which the WTRU may perform measurements for a detected neighbor cell. A set of DL subframes, subframe pattern, or UL/DL configuration which may be implicitly derived by the WTRU or explicitly signaled to the WTRU may apply to all neighbor cells.

A WTRU may receive an indication of validity time that may be associated with an UL/DL configuration, set of DL subframes, or subframe pattern which may be applicable to neighbor cell measurements. Cells with dynamically changing TDD UL/DL configuration may change their UL/DL configuration more frequently than SIBs carrying neighbor cell information may change or more frequently than signaling with updated neighbor cell information may be provided to the WTRU. As such, a WTRU with a serving cell supporting dynamic TDD reconfiguration may at times be using invalid information to perform neighbor cell measurements. A WTRU may invalidate the received neighbor cell set of DL subframes, subframe pattern or UL/DL configuration to be used for measurements after a specified validity time. This validity time duration may be provided along with the set of DL subframes, subframe pattern or UL/DL configuration and may apply to the scope in which the information applies. Upon the validity timer expiry, the WTRU may stop measurements for the corresponding neighbor cell(s) or set(s) of cells until updated information may be received. The WTRU may attempt to read SIB1 and/or SIB2 for a detected neighbor cell for which the validity timer has expired such that an up-to-date SIB1 specified UL/DL configuration may be read for the neighbor cell, for example, for the purpose of measurements. The WTRU may also, or instead, read SIB2, and possibly specifically PCCH-config IE in SIB2, for example, to determine the validity of the updated measurement configuration for that neighbor cell.

With respect to cell selection and reselection, some WTRUs (for example, WTRUs which may support dynamic TDD reconfiguration) may prioritize dynamic TDD cells over non-dynamic TDD cells. Some WTRUs (for example, WTRUs which may not support dynamic TDD reconfiguration) may prioritize non-dynamic TDD cells over dynamic TDD cells. A WTRU may receive information regarding whether a TDD cell supports dynamic reconfiguration as part of broadcasted system information from the dynamic TDD cell. A WTRU supporting dynamic TDD reconfiguration may select (for example, only select) a dynamic TDD cell for example as a serving cell. A dynamic TDD cell may include in a SIB such as SIB1 one or more threshold or parameter values, such as a non-zero Q-rxlevmin or Q-qualminoffset IE value, which may be used in prioritization. For example, these one or more values may result in a legacy WTRU requiring a higher measured RSRP or RSRQ value to consider a dynamic TDD cell as suitable. For a WTRU supporting dynamic TDD reconfiguration, if the WTRU may detect a cell as a dynamic TDD cell, the WTRU may disregard one or more threshold or parameter values (for example the offset) which may result in the WTRU needing a lower cell selection criterion (for example, S-criteria) to be met for this dynamic TDD cell to be considered a suitable cell.

Some WTRUs (for example, those that support dynamic TDD reconfiguration) may prioritize dynamic TDD capable cells over non-dynamic TDD capable cells. Dynamic TDD capable cells may be deployed in a cluster of cells.

A WTRU may receive a higher cell re-selection frequency priority for one or more dynamic TDD capable cells. The WTRU may receive a lower cell re-selection frequency priority for one or more non-dynamic TDD cells.

A WTRU may receive inter-frequency neighbor cell information with possibly different Q-qualmin or Q-rxlevmin defined on a per cell basis, and/or it may receive a value that may be used for cell selection criteria (for example, S-criteria) evaluation specific for dynamic TDD cells, for example, the value that may be used by WTRUs that support dynamic TDD reconfiguration, may be such that cell re-selection criteria may favor dynamic TDD cells over semi-static TDD cells in higher priority frequency neighbors.

A WTRU may receive per cell offsets, for example, Qoffsets,n. For example, in the case of having intra-frequency neighbor cells or equal or lower priority inter-frequency neighbor cells, some WTRUs (such as those that support dynamic TDD reconfiguration) may prioritize dynamic TDD cells with higher rank than semi-static TDD cells. The WTRU may receive dedicated information which may override the related configuration provided in system broadcast information from the cell.

A WTRU may autonomously increase the priority of the frequency which has a dynamic TDD cell or increase the priority of the dynamic TDD cell itself, for example by changing the offset value for S-criteria evaluation, based on previous measurement knowledge of dynamic TDD cells or through detection of dynamic TDD cells by means of neighbor cell measurements. This may be similar to autonomous re-prioritization of Closed Subscriber Group (CSG) cells and multimedia broadcast/multicast service (MBMS) cells.

Regarding DRX and Paging, the paging capability on a particular subframe, for example, subframe 6, may depend on that subframe being a regular DL subframe or a special subframe. WTRUs that, for example, due to UL/DL reconfiguration, may not know whether a subframe such as subframe 6 is a regular DL or a special subframe may miss a paging occasion.

One or more of the following may be applied in any combination and in any order. A WTRU may not expect any paging which may be intended for it in subframe 6 which may be regardless of whether an eNB may transmit a paging message in that subframe. A WTRU may receive a WTRU-specific TDD UL/DL configuration which may set the DL subframe 6 as a special subframe. The network may not allocate subframe 6 as a paging occasion. As an example, this may be accomplished by not setting the "nB" parameter to 4*T such that not all four subframe occasions may be used for paging. The WTRU may receive a reference configuration which it may follow (or use) for paging and/or one or more other procedures.

The WTRU may follow (or use) the above procedure to determine the PDSCH region or the possibility for receiving a system information (SI) message in subframe 6. The WTRU may receive a PDSCH transmission in this subframe which may use a different PRB size than that of a broadcast message. For receiving an assignment addressed in the PDCCH, such as an assignment for PDSCH carrying system information or paging information, the WTRU may use a SIB1 UL/DL configuration to determine the subframes to monitor for PDCCH (or which may contain PDCCH) with SI-RNTI or P-RNTI, or a configured dynamic TDD UL/DL configuration. Regarding the above description, EPDCCH may be applicable in place of PDCCH.

With respect to handover, a WTRU that may be unaware of dynamic TDD reconfiguration in a target cell, may not be handed over properly to that cell. A WTRU may receive signaling, such as RRC signaling which may include an RRC message which may be an RRC reconfiguration message with mobilityControlInfo IE, from the source eNB to trigger a handover to a target cell which may be identified in the message. The signaling, for example, an RRC message or another message, may contain one or more of the following: the cell-specific, for example, SIB1 specified, TDD configuration, for example, TDD UL/DL configuration, of the target cell; an indication as to whether or not the target cell is a dynamic TDD cell (for example, whether or not it supports dynamic reconfiguration of the TDD UL/DL configuration); one or more WTRU-specific or procedure-specific TDD UL/DL configurations such as the current WTRU-specific or procedure-specific TDD UL/DL configuration or configurations, possibly for the case or only for the case in which the target cell may be a dynamic TDD cell; a set of possible TDD configurations that the target cell may use during its reconfiguration from a current UL/DL configuration, possibly for the case or only for the case in which the target cell is a dynamic TDD cell.

The WTRU may use the current and possibly the other set of TDD configurations to properly choose the resource for synchronization with the target cell, and/or the signaling to complete the handover procedure. Alternatively, the WTRU may use the cell-specific (such as SIB1) UL/DL configuration for determining the resource (for example, DL subframe(s)) for synchronization with the target cell and/or the resources (for example, PRACH resources) for signaling the completion of the handover procedure. In case the handover procedure fails at any step using a WTRU-specific or procedure-specific TDD UL/DL configuration, the WTRU may fall back to the SIB1 specified TDD UL/DL configuration of the target cell and re-attempt the synchronization and/or handover completion process.

In case of WTRU handover failure, for example due to radio link failure or expiry of the related timer, such as T304, the WTRU may attempt to re-establish its RRC connection to the source cell reverting to the previously used configurations. In this case, the WTRU may, as part of the re-establishment procedure, attempt to re-synchronize with the source cell based on its previously configured WTRU-specific or procedure-specific configuration(s), and if that fails, the WTRU may fall back to using the cell specific (for example, SIB1) configuration. Alternatively, the WTRU may use the cell specific (for example, SIB1) TDD UL/DL configuration for re-establishment regardless of any previously configured WTRU-specific or procedure-specific configuration(s). Using an UL/DL configuration may include basing one or more of the following on the UL/DL configuration: the directions of the subframes, the timing for scheduling and HARQ for each of UL and DL, the locations of sync channels and reference signals, the allocation of PRACH resources, and the like.

With respect to handling semi-persistent scheduling (SPS) in TDD, SPS configuration may be UL/DL configuration dependent in some cases which may result in confusion in a dynamic TDD cell. A WTRU may receive a cell specific (for example, SIB1 specified) UL/DL configuration, and/or may receive one or more WTRU specific UL/DL (or possibly DL only) configuration(s).

Given the SPS process dependencies on the UL/DL configuration of a TDD cell, for example, a dynamic TDD cell, the WTRU may receive an explicit indication as to which UL/DL configuration to use as reference for both UL and DL SPS process and/or for each process independently. For example, the WTRU may receive an indication which may be included in the SPS configuration which may be provided by RRC signaling, as to which UL/DL configuration to use. The WTRU may receive an indication to use the cell specific (for example, SIB1 specified) UL/DL configuration for UL and/or DL SPS process.

A WTRU may receive a specific UL/DL configuration value indicating the SPS configuration, which it may apply to the SPS process. The WTRU may use subframes 0 and 5 for DL SPS process and subframe 2 for UL SPS process, such that it may not be UL/DL configuration dependent.

A WTRU may use the cell-specific (for example, SIB1 specified) TDD UL/DL configuration for the UL SPS process, for example, for the UL SPS timing relationships such as for HARQ and retransmission.

A WTRU may use a WTRU-specific or procedure-specific TDD UL/DL configuration for the DL SPS process, for example, for the DL SPS timing relationships such as for HARQ and retransmission. The configuration may be the same as the one which may be used by the WTRU for DL PDSCH (for example, DL PDSCH scheduling) and its associated DL HARQ (for example, for the timing of DL PDSCH scheduling and DL HARQ).

It may be possible that due to an UL/DL reconfiguration, a currently configured SPS process may no longer be valid, for example, an UL subframe for SPS has now become a DL subframe or vice versa. The reconfiguration may, for example, be a result of a reconfiguration of the cell specific (for example, SIB1 specified) UL/DL configuration, a reconfiguration of a WTRU-specific or procedure-specific UL/DL configuration, or due to a change in the direction of subframes.

The WTRU may perform one or more of the following. The WTRU may receive an explicit release of current SPS configuration(s), which may be with or followed by the reception of a new SPS configuration or configurations which may be applicable to the new UL/DL configuration, and the WTRU may release and/or apply the SPS configuration(s) accordingly. If based on the SPS configuration(s) and the applicable UL/DL configuration the WTRU may transmit or receive in a subframe which has an opposing direction to the intended action and an SPS release may not have been received, the WTRU may not transmit or attempt to receive in that subframe. The WTRU may release the current SPS configuration upon (or as a result of) receiving the UL/DL configuration. The WTRU may autonomously release an SPS configuration which may have become invalid due to a change in UL/DL configuration or a change in the direction of subframes. The WTRU may consider SPS as inactive until a new configuration is received from the eNB. If the WTRU has been configured with a WTRU-specific UL/DL configuration, it may also receive an indication to fall back to a cell specific (for example, SIB1 specified) UL/DL configuration for DL and/or UL SPS. The WTRU may receive a PDCCH ordered activation of SPS procedures to re-start the SPS upon or following reconfiguration of an UL/DL configuration.

In a scenario where there may be an UL/DL configuration mismatch between neighboring cells and a WTRU, the WTRU may not be able to properly perform some measurements, for example, RSRP measurements. A WTRU in Connected mode may receive the information regarding UL/DL configuration or subframe pattern for intra-frequency and inter-frequency measurements via the MeasObjectEUTRAN in RRC signaling from an eNB. The WTRU may be reconfigured with a different MeasObjectEUTRAN, for example when the UL/DL configuration of the neighboring cells changes.

A WTRU may read neighbor cell system information such as SIB1 to obtain the cell specific UL/DL configuration of a neighbor cell, for example for the purpose of efficient neighbor cell measurements. A WTRU may receive a set of cells, for example in the measurement object from its serving cell, for which the WTRU may read SIB1, for example as part of its measurement procedures, so the SIB1 based UL/DL configuration of a specific dynamic TDD cell or cells may be retrieved.

A WTRU may receive a cell blacklist which may include neighbor dynamic TDD cells when configuring the measurement object for legacy WTRUs. This blacklist may, for example, be used for controlling mobility of legacy WTRUs to dynamic TDD cells.

If PCell and/or SCell TDD UL/DL configurations may be changing, there may be a mismatch between PDCCH subframe counts of certain DRX timers. Such mismatch may create confusion between inactive time perceived by the WTRU and inactive time assumed by the eNB. As a solution, during the transition period between two TDD UL/DL configurations, the WTRU may suspend some or all DRX related timers and may remain active until the new UL/DL configuration has taken effect, which may be based on signaling and activation procedures as described throughout. The WTRU may receive a notification whether to use a WTRU-specific or SIB1 specific UL/DL configuration for the DRX operations. At the start of a DRX cycle, the WTRU may receive some information as to which UL/DL configuration to use for the reference for DRX operation. This may be received by the WTRU in the form of a MAC CE or explicitly signaled to the WTRU via RRC signaling.

The WTRU may receive PDCCH in any downlink subframe indicated by the WTRU-specific TDD UL/DL configuration.

In one embodiment, for the purpose of DRX operation (for example, if configured), for example in RRC Connected mode, a WTRU which may be configured with a WTRU-specific TDD UL/DL configuration may consider a subframe that is a downlink subframe according to the WTRU-specific TDD UL/DL configuration as a PDCCH-subframe. A PDCCH-subframe may refer to a subframe which may carry PDCCH and/or EPDCCH (for example, if EPDCCH is configured). A PDCCH-subframe may be a subframe that may be counted when determining activity, inactivity, and the like for the purpose of DRX. This may, for example apply or only apply for a period during which the WTRU-specific TDD UL/DL configuration may be activated and/or used.

In another embodiment, wherein a subframe may be a downlink subframe only, the WTRU-specific TDD UL/DL configuration may not be considered as a PDCCH-subframe for the purpose of DRX operation, for example in RRC Connected mode.

A WTRU may perform one or more of the following procedures related to DRX and its associated timers, upon receiving a reconfiguration of a TDD UL/DL configuration from the eNB. If one or more ongoing HARQ processes have been cancelled or suspended during the transition from old to new configuration, the WTRU may: stop and/or reset a HARQ-RTT timer which may have been started based on PDSCH reception in the previous frame with the old UL/DL configuration; stop and/or reset an ongoing drx-Retransmission Timer; or re-start on Duration Timer based on re-starting the ongoing short or long DRX cycle. Based on the restarting of this timer, the WTRU may return to active time, if not already in that state.

If one or more ongoing HARQ processes have been continued during the transition, then the WTRU may: continue the DRX process and associated timers uninterrupted; continue the HARQ RTT timer based on the previous UL/DL configuration for any ongoing HARQ process, where new HARQ processes based on a new DL grant may start the HARQ RTT timer based on the new UL/DL configuration; set the drx-Retransmission timer based on the new UL/DL configuration; or start or restart any timers in the frame after the transition based on the new UL/DL configuration as reference, both for any timer duration, for example, for HARQ-RTT timer of for PDCCH-subframes.

A WTRU may, during reconfiguration of TDD UL/DL configuration, also receive a DRX Command MAC CE at the same time. For example, along with TDD UL/DL configuration which may be delivered to the WTRU via PDCCH, the WTRU may receive indication of PDSCH, which may contain the MAC CE for DRX command. Upon reception of the DRX command, a WTRU may, stop and/or suspend any ongoing DRX procedures. If a WTRU may be configured with DRX but no DRX cycle or timer has been started, then the WTRU, upon reception of this command, may start the short or long DRX cycle. A WTRU may use the new TDD UL/DL configuration as a reference for the PDCCH-subframe for the DRX related timers.

For certain operation such as when a WTRU may use an UL/DL configuration which may be different than the UL/DL configuration which the eNB may have most recently configured, a WTRU may suspend DRX operation and reset all ongoing DRX timers. A WTRU may remain in active time and suspend counting of PDCCH-subframes until the UL/DL configuration update has been received from the eNB, possibly by RRC, PDCCH, or other indication mechanisms. The WTRU may continue to suspend DRX operations until DRX Command MAC CE may be received from the eNB, at which point, the WTRU may re-start the DRX operations from an initial state, at the beginning of short or long DRX cycle, as configured.

A dynamic TDD capable cell may (or may have to) support both advanced WTRUs (for example, dynamic TDD WTRUs) and legacy WTRUs. There may be limitations imposed by legacy WTRUs on the dynamic TDD procedure if TDD UL/DL reconfiguration may be applied to legacy WTRUs. For example, a reconfiguration period may (or may need to) be slow and/or within the limits of the legacy WTRUs. As another example, service interruption which may be undesirable may be experienced by legacy WTRUs, for example, when the reconfiguration may occur or be applied. Solutions which may partially or fully remove one or more limitations which may be imposed by legacy WTRUs may be of interest.

SIB1, for example for a cell, may include TDD specific configuration information such as a TDD UL/DL configuration for the cell. In some embodiments, the SIB1 UL/DL configuration may be considered to be the cell-specific TDD UL/DL configuration for the cell. For certain WTRUs, such as legacy WTRUs, the SIB1 UL/DL configuration may be considered to be the only TDD UL/DL configuration for the cell.

Some WTRUs may follow (or use) the timing and procedures corresponding to a cell-specific TDD UL/DL configuration which may be broadcast, for example by an eNB, through the cell, for example by or in SIB1, and may be receivable by or intended for reception by certain WTRUs such as any WTRU or all WTRUs.

Some WTRUs may consider one or more subframes, for example for a cell such as a serving cell, as DL subframes, which may be indicated as UL subframes for other WTRUs, for example for the same cell, for at least one or some operation procedures, for example, PDSCH HARQ (e.g., PDSCH HARQ timing) and the like.

In some scenarios such as in some embodiments or for some procedures, special subframes may be treated as or considered to be DL subframes. For example for determining whether to monitor or attempt to decode a DL control channel such as PDCCH or EPDCCH which may be based on determining whether a subframe may be DL, a WTRU may consider or treat a special subframe as a DL subframe.

A subframe which may be considered as an UL subframe in a cell-specific TDD UL/DL configuration and may or may potentially (but not necessarily) be considered as a DL subframe, for example for the same cell, at least for one of the procedures of a WTRU, may be referred to as a "conflicting subframe" for that WTRU. A conflicting subframe may or may always be indicated as an UL subframe in the cell-specific TDD UL/DL configuration. For example, a WTRU such as a WTRU that supports dynamic TDD reconfiguration may consider one or more subframes as DL subframes, for example for a cell such as a serving cell, which may be indicated as UL subframes, (for example, in SIB1), and may be considered as UL subframes, for example for the same cell, by certain other WTRUs such as legacy WTRUs or WTRUs that do not support dynamic TDD reconfiguration, for at least one or some operation procedures such as PDCCH monitoring, PDSCH HARQ (e.g., PDSCH HARQ timing), and the like.

In some embodiments, a subframe which may be considered as a DL subframe in a cell-specific TDD UL/DL configuration and may or may potentially (but not necessarily) be considered as an UL subframe, for example for the same cell, at least for one of the procedures of a WTRU, may be referred to as a "conflicting subframe" for that WTRU.

A WTRU may be configured with one or more TDD UL/DL configurations for example for a certain cell, which may be in addition to the cell-specific TDD UL/DL configuration, for example for the certain cell, where such configured UL/DL configurations may be different from the cell-specific UL/DL configuration. These additional TDD UL/DL configurations may be referred to as WTRU-specific TDD UL/DL configurations.

An eNB may provide or transmit and/or a WTRU may receive an indication of a WTRU-specific TDD UL/DL configuration, for example for a certain cell such as a serving cell, which may be different from the cell-specific TDD UL/DL configuration, for example for that cell; the indication of a WTRU-specific TDD UL/DL configuration may be or contain at least one of the following. An index to a subset of TDD UL/DL configuration(s) for the cell which may be applicable, or the index, configuration number, or other identification of the TDD UL/DL configuration itself may be included in the indication. A default configuration may be associated to the lowest index, for example, to the configuration in SIB1. The default configuration may be provided by the eNB and/or received by the WTRU in the control signaling which may be used to modify the TDD UL/DL configuration to use, for example, starting from a certain or given radio frame or subframe. A validity time for the signaled configuration may be included in the indication. The validity time may be provided by the eNB and/or received by the WTRU in the control signaling used to modify the TDD UL/DL configuration to use, for example, starting from a certain or given radio frame or subframe. When the validity expires, the WTRU may discard the configuration and/or revert to the cell-specific configuration. A subset of one or more TDD UL/DL configuration(s) which may be applicable, for example for a certain cell, may be included in the indication. Each configuration in the subset may be represented by its configuration number or an IE field such as subframeAssignment in the TDD-Config IE. A subset may be an indexed sequence of TDD-Config IEs (or only the subframeAssignment thereof). An example of possible subsets of TDD UL/DL configurations may be as follows: [#0, #3, #6] (which may, for example, enable a PRACH resource to be configured in subframe #4 with PRACH config index 0); [#1,#4] (which may, for example, enable a PRACH resource to be configured in subframe #3 with PRACH config index 0); [#2,#5] (which may, for example, enable a PRACH resource to be configured in subframe #2 with PRACH config index 0); all TDD configurations.

A WTRU may derive an indication of the WTRU-specific TDD/UL configuration(s) from the cell-specific and/or some previously determined WTRU-specific TDD UL/DL configurations (for example, provided through explicit signaling). For example, a lookup table may be used by the WTRU to determine one or more WTRU-specific TDD UL/DL configurations based on the cell-specific TDD UL/DL configuration.

With respect to UL/DL direction of transmissions, a WTRU-specific TDD UL/DL configuration may have its own set of conflicting subframes. These conflicting subframes may be the subframes indicated as UL subframes in a cell-specific TDD UL/DL configuration, for example for a certain cell, and indicated as DL subframes in that WTRU-specific TDD UL/DL configuration which may, for example be for the same cell.

A WTRU may receive (or attempt to receive), or only receive (or only attempt to receive), data and/or signaling in subframes which may be determined (for example by the WTRU) as (or to be) DL subframes, for example for a certain cell such as a serving cell. A WTRU may transmit, or only transmit, data and/or signaling in subframes which may be determined (for example by the WTRU) as (or to be) UL subframes, for example for a certain cell such as a serving cell.

Receiving or attempting to receive in a subframe in the DL may include at least one of monitoring a PDCCH, monitoring an EPDCCH, decoding a PHICH and decoding PDSCH.

An eNB may transmit data and/or signaling for example for a certain cell to or intended for one or more WTRUs (such as dynamic TDD WTRUs) in subframes which may be indicated as UL subframes for example in the cell-specific TDD UL/DL configuration of that cell which may be broadcast by the eNB or cell for example in a SIB such as SIB1. A eNB may receive (or attempt to receive) data and/or signaling for example for a certain cell from one or more WTRUs (such as dynamic TDD WTRUs) in subframes which may be indicated as DL subframes for example in the cell-specific TDD UL/DL configuration of that cell which may be broadcast by the eNB or cell for example in a SIB such as SIB1.

In certain descriptions and embodiments herein, when referring to one or more of a cell-specific TDD UL/DL configuration, one or more WTRU-specific TDD UL/DL configuration(s), and UL/DL directions of subframes, such references may be for a certain cell, which may be a serving cell and/or which may be the same cell for some of the references such as all the references.

A WTRU may determine the UL/DL direction of one or a set of subframes, for example for a certain cell such as a serving cell, by using one or a combination of the following techniques. The WTRU may determine the direction of the transmission of subframes to be the same as those indicated by the cell-specific TDD UL/DL configuration, for example for the cell. The WTRU may determine the direction of the transmission of subframes to be the same as those indicated by a WTRU-specific TDD UL/DL configuration, for example for the cell. The WTRU may determine the direction of the transmission of subframes as a function of the cell-specific and/or one or more WTRU-specific TDD UL/DL configurations, for example for the cell. The WTRU may receive the direction of transmission as a part of reception of the indication of the conflicting subframes, for example for the cell. The WTRU may consider, for example for the cell, a particular subframe to be a DL subframe for some processes and (possibly at the same time) may consider the same subframe to be a UL subframe for some other processes.

The WTRU may determine the direction of transmission, for example for a cell such as a serving cell, as a part of explicit and/or implicit signaling which may be applied to one or more consecutive radio frames. For example, the WTRU may consider all UL subframes of a first half of a radio frame as DL subframes until it may receive explicit signaling, for example indicating the contrary (for example, signaling may control the first occurrence of the UL/DL transition in the radio frame, such as subframe #1). The WTRU may consider all UL subframes of a second half of a radio frame as DL subframes until it may receive explicit signaling, for example to the contrary (for example, signaling may control the second occurrence of the UL/DL transition in the radio frame, such as subframe #6). The WTRU may consider any set of consecutive UL subframes as DL subframes until it may receive explicit signaling, for example to the contrary (for example, the transition point may be explicitly signaled).

The WTRU may receive one or more indications of UL/DL direction of subframes through higher layer and/or physical layer signaling. As an example, the WTRU may receive or expect to receive such indication through a DCI format or message which may be transmitted, for example by an eNB, at a predefined or preconfigured time such as a certain subframe within each radio frame, each set of radio frames, or pattern of radio frames. For example, a WTRU may receive or expect to receive an indication of UL/DL direction in subframe m of every n radio frames or of each preconfigured set of n radio frames. The value of n may be fixed such as 1 or 4, or may be configured. The value of m may be fixed such as 0 or 1 (for example, the first subframe of the radio frame), or may be configured. The WTRU may be configured by higher layer signaling, for example, RRC signaling, with which frames and/or which subframes, such as which subframe in those frames, the WTRU may receive or expect to receive an indication of UL/DL direction.

The WTRU may apply a newly received indication of UL/DL transmission directions or direction pattern using one or a combination of the following:

The WTRU may not change the UL/DL transmission directions or direction pattern for subframes for a period of a certain, possibly preconfigured, number of subframes or radio frames, for example, following the reception of an indication of UL/DL transmission directions. This period may be referred to as the reconfiguration period. If the UL/DL transmission directions are transmitted, received, scheduled to be received, or intended for reception, periodically, each period may be a reconfiguration period.

The WTRU may change the UL/DL direction of subframes soon after, for example as soon as, it may receive the signaling indicating UL/DL direction of subframes. For example, a WTRU which may receive such signaling in a subframe, such as subframe #0 of a radio frame, such as the first radio frame, of the reconfiguration period, may apply the potentially new UL/DL direction in the same reconfiguration period. For example, a WTRU may apply the potentially new UL/DL direction in the same frame, starting from a subframe (such as subframe #3) in the same frame, or in the next frame or starting in a fixed frame offset k from the frame in which the signaling is received. An eNB may transmit an indication of UL/DL direction of subframes multiple times (for example in multiple frames and/or subframes) within a reconfiguration period, for example to provide multiple opportunities for a WTRU to correctly receive the indication.

Upon reception of the signaling indicating the UL/DL direction of subframes in a current reconfiguration period, the WTRU may apply the received UL/DL direction of subframes or change the UL/DL direction of subframes starting from the next reconfiguration period, for example, from the beginning of the next reconfiguration period.

The WTRU may consider a subframe as a DL subframe in one or more radio frames, but may consider it as a UL subframe in other radio frames. The WTRU may determine the direction of transmission as DL if it may not receive any UL transmission request for that subframe, for example, UL scheduling grant, for that or those subframes. The WTRU may determine the direction of transmission as DL if it may not be required to transmit an UL signal in that subframe, for example, PUCCH, in that or those subframes. The WTRU may determine the direction of transmission as UL if it may receive at least one UL transmission request for that subframe, such as an UL scheduling grant. The WTRU may determine the direction of transmission as UL if it may be required to transmit an UL signal in that subframe, for example, PUCCH.

The WTRU may determine the direction of transmission of a subframe as a function of the transmission of other subframes. As an example, upon the reception and/or detection of a PDSCH allocation or grant by a WTRU in a subframe, the WTRU may consider all next conflicting subframes to be DL subframes until the next specially indicated subframe. Examples for specially indicated subframe may include special subframes indicated in a cell-specific TDD UL/DL configuration, in a WTRU-specific TDD UL/DL configuration, by the set of indication of conflicting subframes, and the like. As another example, one or more subframes between two DL subframes may be considered as a DL subframe. One or more subframes between two UL subframes may be considered as an UL subframe.

Once a WTRU may determine a subframe as a DL subframe, it may not try to transmit information in that subframe. Once a WTRU may determine a subframe as an UL subframe, it may not try to receive information in that subframe.

A WTRU may determine the UL/DL direction of subframes as a function of one or more configuration parameters and/or indications of UL/DL direction of subframes. Examples of such indications may be an index or other indication of a TDD UL/DL configuration such as a reference TDD UL/DL configuration which may be used for the directions, a bit-map indicating UL and/or DL subframes, and the like. The UL/DL direction of subframes may be a function of an indication of the UL/DL direction of subframes provided through higher layer signaling and/or physical layer signaling, cell-specific TDD UL/DL configuration, one or more WTRU/procedure-specific TDD UL/DL configuration(s), and the like.

A WTRU-specific TDD UL/DL configuration, for example for a certain cell such as a serving cell, may be transmitted to and/or received by one or more WTRUs. A WTRU which may receive or may have received and/or may be configured with at least one WTRU-specific TDD UL/DL configuration, for example, a TDD UL/DL configuration which may be different from the cell-specific TDD UL/DL configuration, for example for the same cell, may perform at least one of the following mechanisms.

The WTRU may apply one or more rules corresponding to a WTRU-specific TDD UL/DL configuration to one or more particular procedures. The WTRU may apply the rules of different WTRU-specific TDD UL/DL configurations to different procedures. In certain scenarios such as this scenario, a WTRU-specific TDD UL/DL configuration may be treated or considered as a procedure-specific TDD UL/DL configuration. "WTRU-specific TDD UL/DL configuration," "procedure-specific TDD UL/DL configuration" and "WTRU/procedure-specific TDD UL/DL configuration" may be used interchangeably. For example, a WTRU may derive timing relationships and/or format for transmission of UL and/or DL HARQ feedback and/or for UL scheduling (e.g., grants) and/or DL reception based on a procedure-specific TDD UL/DL configuration (for example, a different, possibly compatible, UL/DL TDD assignment or timing relationship in addition to those of the cell-specific configuration). As another example, the WTRU may perform one or more procedures related to DL reception, measurements and/or handling of applicable timers for a given serving cell when the WTRU may be configured with a WTRU-specific TDD UL/DL configuration, where such procedures may be performed by the WTRU in a subframe which may be indicated as a DL subframe in the WTRU-specific TDD UL/DL configuration.

The WTRU may comply with the rules of one or more WTRU/procedure-specific TDD UL/DL configurations by overriding some or all rules corresponding to the cell-specific configuration. The WTRU may apply one or some rules corresponding to the cell-specific TDD UL/DL configuration to one or more procedures. For example, the WTRU may apply the timing relationship of the cell-specific TDD UL/DL configuration to UL scheduling and/or PUSCH HARQ timing. The cell-specific TDD UL/DL configuration may be considered to be a procedure-specific TDD UL/DL configuration for certain WTRUs such as those supporting dynamic TDD reconfiguration.

Different WTRUs may follow (or use or apply) the rules of different WTRU/procedure-specific TDD UL/DL configurations for one or more procedures.

The WTRU may perform blind decoding of (for example monitor and/or attempt to decode) the applicable DL physical control channel (for example, PDCCH and/or EPDCCH) in a serving cell in subframes which may be indicated as DL in a WTRU-specific TDD UL/DL configuration with which the WTRU may be configured. The WTRU may or may only perform blind decoding for (for example monitor and/or attempt to decode) DCIs related to DL transmissions, for example, for DL PDSCH assignment, aperiodic CSI request, DL SPS activation and the like. The WTRU may determine the rules of some procedures as a function of the cell-specific TDD UL/DL configuration and/or one or more WTRU/procedure-specific TDD UL/DL configurations. For example, a WTRU with a cell-specific as well as at least one WTRU/procedure-specific TDD UL/DL configuration may follow (or use) the PDSCH HARQ timing of the TDD UL/DL configuration according to the configuration which has fewer UL subframes.

A WTRU may receive and/or determine one or more WTRU/procedure-specific TDD UL/DL configurations. Such configuration(s) may be used as reference TDD UL/DL configuration(s) for one or more specific procedures, for example, for some or all UL-related procedures, for some or all DL-related procedures, for determination of the UL/DL direction of subframes, for some or all measurement procedures, and the like.

A WTRU may interpret a regular subframe as a special subframe, or vice versa, based on at least one of the following mechanisms. The WTRU may change (or toggle) the state of a special subframe (for example, for the second half of a radio frame such as for subframe #6) to a normal DL subframe (and vice-versa). The WTRU may treat a conflicting subframe (X) as a special subframe if it determines subframe (X) as a DL subframe and it determines subframe (X+1) as an UL subframe. The WTRU may consider that a subframe indicated as an UL subframe according to a cell-specific configuration may be changed to a normal DL subframe (for example, for subframes of the second half of a radio frame such as subframe #7, #8, and/or #9) (and vice-versa).

A WTRU may receive information in some or all of the OFDM symbols of a subframe possibly using one or a combination of the following procedures. The WTRU may treat a subframe indicated as a DL subframe in either cell-specific or WTRU-specific TDD UL/DL configuration as a special subframe. In this case, the WTRU may receive information in only a subset of OFDM symbols of the subframe.

The WTRU may treat a regular DL subframe as a modified subframe, which may be different than the regular DL, UL or special subframe. As an example the number of DL OFDM symbols in this subframe may be less than those of the regular DL subframe and/or the subframe may consist of two parts where the first part of the subframe, for example, certain number of consecutive OFDM symbols at the beginning of the subframe, may be considered as DL OFDM symbols (similar to DwPTS in special subframes) and/or the second part of the subframe, for example, certain number of consecutive OFDM symbols at the end of the subframe, may not be used by the WTRU and may be treated as guard period, and the like.

Other examples of different modified subframes may include, but may not be limited to, the following. A subframe where the CRS may not be transmitted irrespective of the number of antenna ports detected in PBCH, for example, a CRS-less subframe such as one which may be supported in some operation modes of certain carriers such as an LTE new carrier type (NCT). A subframe in which the CRS overhead may be reduced in some way as compared with normal subframes, for example, a CRS-minimized subframe such as one which may be supported in some operation modes of certain carriers such as NCT. A subframe where a part of the subframe may be defined as normal subframe and the other parts may be defined as NCT subframe, for example, mixture of normal and NCT subframe.

A WTRU may use different subframe types for different subframes in a radio frame for DL reception and/or UL transmission. In the following, the definition and operation of the modified subframe are described.

A WTRU may determine the format of a modified subframe by using one or a combination of the following techniques. The WTRU may use the length of GP configured for the special subframe, which may be signaled in the TDD-config of the current cell, as the GP length of the modified subframe. The WTRU may use a configuration of modified subframe with a length of DwPTS or GP specified by the eNB. The WTRU may use a deterministic or a pre-configured configuration for the modified subframe.

If the WTRU uses the length of GP configured for the special subframe, which may be signaled in the TDD-config of the current cell, as the GP length of the modified subframe, the WTRU may determine the length of DwPTS as the sum of DwPTS and UpPTS of the corresponding special subframe configuration. For example, for special subframe config #4 with normal CP advertised in TDD-config of SIB1, the WTRU may understand that the modified subframe has 13 OFDM symbols as DwPTS and 1 OFDM symbol as GP.

A WTRU may determine a pattern of DM-RS for the modified subframe which may be used for TM8, TM9, or EPDCCH, if any, by using one or a combination of the following techniques. The WTRU may use a pattern of DM-RS configured for the special subframe, which may be signaled in the TDD-config of the current cell, as the pattern of DM-RS of the modified subframe. The WTRU may use a fixed DM-RS pattern for modified subframes which may have a GP length less than or equal to a threshold. For example, the DM-RS pattern for special subframe configurations 3, 4 and 8 with a normal CP may be used in a modified subframe with normal CP if the GP length of the modified subframe <=3 OFDM symbols.

A WTRU may use the same pattern of DM-RS configured for a special subframe which has the shortest UpPTS among all special subframe configurations for which the length of GP may be equal to that of the modified subframe.

The WTRU may use a DM-RS pattern signaled by the eNB. The pattern may correspond to a pattern used in one of the special subframe configurations.

A WTRU may determine a number of effective PRBs which may be equal to or less than the number of assigned PRBs in a modified subframe. Upon the first HARQ reception in a modified subframe, a WTRU may use at least the number of effective PRBs and the Transport block size (TBS) index to determine the TBS of PDSCH. A WTRU may perform at least one or a combination of the following steps in any order to determine the number of effective PRBs. A WTRU may determine the effective number of PRBs as if in a special subframe. A WTRU may determine the effective number of PRBs by applying a multiplication factor (for example, # of DwPTS symbols/14 in normal CP, # of DwPTS symbols/16 in normal CP) to the assigned number of PRBs.

A WTRU may determine the effective number of PRBs by applying a multiplication factor defined for a given GP length to the assigned number of PRBs. A mapping table may be required for different GPs in order for the WTRU to determine the factor.

If a WTRU may determine the effective number of PRBs as if in a special subframe, the WTRU may determine which special subframe configuration by using one or a combination of the following techniques. The special subframe configuration used may be the same as the special subframe configuration signaled in the TDD-config of the current cell. The special subframe configuration used may be one of the special subframe configurations which may have the shortest UpPTS among all special subframe configurations for which the length of GP may equal that of the modified subframe.

A WTRU may receive an indication of the subframe type for one or more subframes using one or a combination of the following procedures and/or techniques. The WTRU may receive an indication of the subframe type which may or may not override the current configuration and/or operation assumption of the WTRU. As an example, the WTRU may be informed to treat a subframe as a special subframe where in the TDD UL/DL configuration to be followed (or used) by that WTRU, that subframe may be marked or identified as a regular subframe such as a regular DL subframe.

The WTRU may receive the subframe type indication as a part of UL and/or DL grant. As an example, a WTRU may receive an indication in the grant indicating whether the indicated subframe is to be treated as a special subframe or not.

A WTRU may receive an indication of a subframe type indicating that the first part of the subframe, for example, certain number of consecutive OFDM symbols at the beginning of the subframe, may be considered as DL and/or the second part of the subframe, for example, certain number of consecutive OFDM symbols at the end of the subframe, may be considered as UL OFDM symbols. There may be a certain number of the consecutive OFDM symbols between the aforementioned first part and second part allocated to guard time, potentially to be used for RF switching, propagation delay, and the like. The number of guard OFDM symbols may be calculated as the difference between the total number of OFDM symbols in the subframe minus the summation of OFDM symbols in the first part and the second part as described earlier.

A WTRU may receive one or more parameters for the format of a modified subframe by signaling means such as those described herein (for example, via RRC broadcast, RRC dedicated signaling, or physical layer signaling such as via PDCCH or EPDCCH).

The parameters which may be signaled for the modified subframe may include the value, indication and/or index of one or a combination of the following parameters: the GP length, the DwPTS length, the DM-RS pattern, and a multiplication factor for determining the effective number of PRBs.

A parameter value (for example, length of GP or DM-RS pattern) which may be indicated for a modified subframe may be restricted to a subset of the values which may be defined for the same parameter in the special subframe configurations.

A WTRU may receive one or more parameters for the format of a modified subframe together with a DL grant indicating the current subframe as a modified subframe where the DL grant may be provided via PDCCH or EPDCCH.

An eNB may signal, for example dynamically and/or explicitly, to a WTRU that the current subframe is a special subframe or a modified subframe by using one or a combination of the following techniques. The signal may be carried in a DL grant. The signal may indicate whether the subframe is a modified subframe, special subframe or a normal DL subframe. The signal may carry one or more format parameters of a modified subframe. The signal may carry the special subframe configuration if a special subframe is scheduled.

The eNB may or may only signal a subframe type as modified or special subframe in conflicting subframes whose next subframe may be UL in the cell-specific TDD UL/DL configuration. A WTRU may implicitly and/or autonomously determine the current subframe as a special subframe or a modified subframe by using one or a combination of the following techniques. If the next subframe may be an UL subframe in the cell-specific configuration, and the current subframe may be a conflicting subframe (for example, UL or special subframe in the cell-specific configuration and flexible or DL in a WTRU-specific configuration), then the WTRU may determine the current subframe as a modified or special subframe.

If the current subframe may be a SRS subframe in the cell-specific configuration, and the current subframe may be a conflicting subframe in a WTRU-specific configuration (for example, UL or special subframe in the cell-specific configuration and flexible or DL in a WTRU-specific configuration), then the WTRU may determine the current subframe as a special subframe.

A WTRU may or may only apply certain described techniques to, for example, implicitly and/or autonomously, determine the format and/or DwPTS length of RBs carrying control signals (for example, EPDCCH), while the format and/or DwPTS length of RBs carrying PDSCH may be explicitly indicated by a DL grant for example indicated by EPDCCH. The format of the modified subframe may be the same for all subframes explicitly or implicitly determined by the WTRU as a modified subframe. The format of the modified subframe may be different among all subframes explicitly or implicitly determined by the WTRU as modified subframes. For example, the length of GP may be a function of a subframe number and/or SFN, the interference mitigation technique employed by eNBs via X2, and/or the allowed eNB transmit power of a particular subframe. If neighbor cells and/or clusters may be more (or less) likely to use the next subframe as UL, the eNB may configure a subframe of a certain # with a longer (or shorter) GP.

If a WTRU may implicitly or explicitly determine the current conflicting subframe as a modified subframe or special subframe, and if there may be CRS transmission in the current subframe, the WTRU may not use the CRS for radio link monitoring (RLM) or radio resource management (RRM) related measurements.

A WTRU may transmit in the UL direction in a subframe which may be considered as a DL subframe for or by one or more WTRUs, possibly using one or a combination of the following procedures. The WTRU may transmit in a subframe which may be considered by that WTRU as a potential UL transmission subframe. Such potential UL transmission subframes may be indicated to the WTRU as part of the cell-specific and/or WTRU-specific TDD UL-DL configurations. The WTRU may transmit in a subframe which may be considered as a Multimedia Broadcast multicast service Single Frequency Network (MBSFN) subframe by the eNB or for or by one or more WTRUs. The WTRU may transmit in a subframe if may be implicitly or explicitly required to perform an UL transmission. For example, the WTRU may need to provide PUCCH and for that reason it may initiate an UL transmission in a specific subframe. As another example, the WTRU may receive explicit information on which subframes to use for UL transmission. The WTRU may not transmit in a subframe if it determines that that subframe may be configured as MBSFN and/or the subframe may carry DL information to one or more WTRUs, for example, when multi-cast data may be transmitted to all or a subset of WTRUs by means of MBSFN subframes.

The WTRU may transmit in some or all OFDM symbols of a subframe, using one or a combination of the following procedures. The WTRU may skip one or more adjacent OFDM symbols when transmitting. The skipped OFDM symbols may be at the beginning and/or at the end of the subframe. The WTRU may be configured to skip a certain number of the OFDM symbols in an UL transmission. The configured number of skipped symbols may be the same or different for some or all UL subframes of that WTRU. The WTRU may implicitly determine the number of OFDM symbols to skip in an UL transmission. As an example, the WTRU may skip a certain number of adjacent OFDM symbols at the beginning of an UL transmission of a subframe, for example if the subframe may be configured as an MBSFN subframe or may be considered as an MBSFN subframe for one or some WTRUs. The skipped number of OFDM symbols may be a function of one or more factors such as, but not limited to, the MBSFN control channel size, the RF switching time, the propagation delay, the cell size, the cell-specific UL-DL configuration, and the like.

The following relates to an example where a WTRU may follow (or use) one or more WTRU-specific TDD UL/DL configurations for certain procedures and may transmit in subframes which may be DL according to the cell-specific TDD UL/DL configuration. An example embodiment of the proposed mechanisms and techniques is as follows, the parts of which may be performed in whole or in part and in any order. WTRUs may receive TDD UL/DL configuration config_cell via SIB1. Some WTRUs, for example, dynamic TDD WTRUs, may receive a WTRU/procedure-specific TDD UL/DL configuration, for example, config_wtru_1, which may be different from config_cell. For example, the config_cell and config_wtru_1 pair may be selected in a way that the DL subframes indicated by config_wtru_1 may be a subset of the DL subframes indicated by config_cell. The conflicting subframes may consist of subframes which may be marked DL in config_cell and UL in config_wtru_1. Some WTRUs, for example, legacy WTRUs, may be configured with one or more of subframes 3, 4, 7, 8 and/or 9 as MBSFN subframes. Some WTRUs, for example, dynamic TDD WTRUs, may use config_wtru_1 timing and/or opportunity rules for UL scheduling and/or PUSCH HARQ timing and/or PDSCH HARQ timing. Some WTRUs, for example, dynamic TDD WTRUs, may be configured to skip the first X OFDM symbols (for example, X may correspond to 4 OFDM symbols) in their UL subframes if those subframes corresponds to an advertised MBSFN subframe for other WTRUs, for example, legacy WTRUs. Some WTRUs, for example, dynamic TDD WTRUs, may not transmit in UL subframes (for example according to config_wtru_1) which may be indicated as DL in the cell-specific TDD UL-DL configuration and may not be advertised as MBSFN subframes for all or a subset of WTRUs, for example, legacy WTRUs. Certain subframes which may or may always be considered by some WTRUs, for example, legacy WTRUs, as UL subframes may or may always be considered as DL subframes by some other WTRUs, for example, dynamic TDD WTRUs.

An UL HARQ process may consist of a series of consecutive PUSCH transmissions and their corresponding PUSCH HARQ receptions by the WTRU which may last for several frames until the eNB may acknowledge a successful reception of PUSCH. The timing between these PUSCH transmissions and PUSCH HARQ receptions may be a function of the subframe of the initial UL grant and the TDD UL/DL configuration. Considering an ongoing UL HARQ process, when the TDD UL/DL configuration for the current frame may not be the same as for the next available frame, a means to handle the timing of an ongoing UL HARQ process in that next available frame may be needed. A similar problem may occur for DL HARQ processes when the WTRU receives a PDSCH in one frame and the TDD UL/DL configuration for the next available frame, where the corresponding PDSCH HARQ may be transmitted, may be different from that of the frame where the PDSCH may be received.

As a solution, depending on the adaptation time scale which may be needed, intended, or used, different means (for example system information signaling, RRC signaling, MAC control element signaling, physical layer signaling, and the like) may be considered for TDD UL/DL reconfiguration. Regardless of the signaling means, the transition of one TDD UL/DL configuration to another TDD UL/DL configuration may occur at a radio frame boundary, for example synchronously at the WTRU and the eNB.

Any solution and/or mechanism provided in this application may be applied to the WTRU and/or eNB in any arbitrary combination and/or order.

From the WTRU point of view, an UL HARQ process may consist of at least one of the reception of initial PUSCH grant, the transmission of PUSCH, the reception of PUSCH HARQ via PHICH in the DL, the reception of the re-transmission UL grant and their related timing. An UL HARQ process may last for one or several consecutive radio frames. Upon the change of a TDD UL/DL configuration of a WTRU such as a cell-specific and/or WTRU-specific UL/DL configuration, the WTRU may terminate or assume termination of one or some ongoing UL HARQ processes in one or more radio frames such as the last and/or next to last radio frame of the previous TDD UL/DL configuration.

The WTRU may flush out one or some data buffers related to the UL HARQ processes of the previous TDD UL/DL configuration before starting the first radio frame of the new TDD UL/DL configuration. The WTRU may suspend one or some UL HARQ processes for one or some consecutive radio frames.

Following a suspension of one or some UL HARQ processes, for example, starting from radio frame (n+1), once the UL HARQ processes may be resumed, for example, in frame (n+k) where k may be any integer value equal or greater than 2, the WTRU may assume the continuation of the UL HARQ timing from radio frame n ignoring all suspended frames, for example as if the UL HARQ processes timing in the radio frame (n+k) are to be transmitted with the exact same timing as of those in radio frame (n+1).

Alternatively, following a suspension of UL HARQ processes, for example, starting from radio frame (n+1), once the UL HARQ processes may be resumed, for example, in frame (n+k) where k may be any integer value equal or greater than 2, the WTRU may assume the continuation of the UL HARQ timing from radio frame n counting all transmission and reception opportunities corresponding to that UL HARQ process during the suspension period, for example as if all those suspended radio frames have contained PUSCH retransmission and PUSCH HARQ (for example, NACK) reception.

One or some UL HARQ processes may be suspended for one or more radio frames during the transition of one TDD UL/DL configuration to another TDD UL/DL configuration, possibly using one or a combination of the UL HARQ process suspension mechanisms described earlier. For example, upon the reception of the change request of the TDD UL/DL configuration, the WTRU may suspend UL HARQ processes for one or more radio frames, for example, for (k−1) radio frames where k may be any integer value equal or greater than 2. For example, if the last radio frame corresponding to the previous TDD UL/DL configuration is radio frame n, then the next (for example, first) available radio frame corresponding to the new TDD UL/DL configuration may be radio frame (n+k).

The transition procedures of the ongoing UL HARQ processes from the last radio frame of the previous TDD UL/DL configuration to the next (for example, first) available radio frame of the new TDD UL/DL configuration, with suspending one or some UL HARQ processes, may depend on the pair of the configurations consisting of the previous TDD UL/DL configuration, for example, configuration X, and the new TDD UL/DL configuration, for example, configuration Y. The pair of TDD UL/DL configurations (X,Y) may be referred to as a transition pair. As described herein, some solutions may be provided for different sets of transition pairs.

Considering a TDD UL/DL configuration transition pair (X,Y), upon the transmission of the PUSCH in the UL subframe i of the last radio frame of TDD UL/DL configuration X by a WTRU, for which the WTRU might have expected to receive its corresponding HARQ in subframe j of next radio frame according to the timing of the TDD UL/DL configuration X, the WTRU may perform at least one or a combination of the following. The WTRU may not expect to receive a PUSCH HARQ, for example, PHICH, and/or may terminate the corresponding PUSCH HARQ process. The WTRU may assume a successful transmission for that HARQ process.

The WTRU may, however, still keep the corresponding data in the buffer for possibly future transmission. As an example, if the subframe j may not be a DL subframe in the next TDD UL/DL configuration Y, the WTRU may terminate the corresponding HARQ process and may assume an ACK for that process. As another example, if the subframe i may not be an UL subframe in the next TDD UL/DL configuration Y, the WTRU may terminate the corresponding HARQ process and may assume an ACK for that process.

If subframe j may be a DL subframe in TDD UL/DL configuration Y, then the WTRU may expect to receive the corresponding PUSCH HARQ feedback in the DL subframe j of the next available radio frame, for example, the first available radio frame of the new TDD UL/DL configuration Y. Based on reception of PHICH in subframe j of the next frame, the WTRU may use the HARQ timing process of configuration Y for transmission of PUSCH, in case of retransmission.

If based on new UL/DL configuration Y HARQ timing process, there may be no corresponding PHICH resource for PUSCH transmission from the previous frame in subframe j of the following frame, then the WTRU may follow (or use) the corresponding procedures as follows, depending on the availability of an UL subframe. Following the change to UL/DL configuration Y, the WTRU may, for the purpose of HARQ timing, follow (or use) the previous configuration, for example, UL/DL configuration X for PUSCH transmission based on PHICH reception in subframe j. The WTRU may continue to follow (or use) the previous UL/DL configuration for one frame or one frame only, or until any ongoing HARQ processes from the previous configuration may have been completed. The WTRU may follow (or use) PHICH reception timing based on configuration Y, and may expect the HARQ feedback in the next DL subframe for which there may be an allocated PHICH resource based on configuration Y. The WTRU may terminate HARQ process without reception of PHICH in the next frame.

As an example, the WTRU may be indicated with a change of UL/DL configuration from configuration 0 in current frame n to configuration 1 in the next frame, frame n+1. In frame n, the WTRU may, based on previous UL grant or PHICH reception, transmit PUSCH in subframe 4. Based on the configuration 0 HARQ timing, PHICH corresponding to PUSCH transmission may be received by the WTRU in subframe 0 of the next frame, n+1. Since based on new configuration Y HARQ timing in frame n+1, there may be no PHICH resource for subframe 0, the WTRU may expect the PHICH in the DL subframe 1 which may have PHICH allocation for HARQ-ACK feedback. The WTRU may then transmit the corresponding PUSCH (e.g., if the PHICH indicated NACK) based on the HARQ timing of configuration Y.

If subframe i may be an UL subframe in TDD UL/DL configuration Y, then the WTRU may expect to receive the corresponding PUSCH HARQ feedback in a DL subframe according to the timing of PUSCH HARQ process of the TDD UL/DL configuration Y which may include a PUSCH transmission in the UL subframe i.

Once the WTRU may receive the corresponding PUSCH HARQ feedback, for example, PHICH, in a DL subframe of the first radio frame of the new TDD UL/DL configuration Y (for example, the next available radio frame), the WTRU may follow (or use) the PUSCH HARQ process timing of the TDD UL/DL configuration Y which may include the reception of a PUSCH HARQ feedback received in that DL subframe.

In a first embodiment, consider the TDD UL/DL configuration pair of (X,Y), where the WTRU may receive indications to switch from TDD UL/DL configuration X to the TDD UL/DL configuration Y. Upon transmission of the PUSCH in the UL subframe i of the last radio frame of TDD UL/DL configuration X by a WTRU, for which the WTRU might have expected to receive its corresponding HARQ in subframe j of next radio frame according to the timing of the TDD UL/DL configuration X, the WTRU may perform at least one or a combination of the following.

Table 6a illustrates examples of TDD UL/DL configuration transition pairs (X,Y), for which UL subframes of TDD UL/DL configuration X are a subset of UL subframes of the TDD UL/DL configuration Y. If the set of UL subframes of the TDD UL/DL configuration X may be a subset of UL subframes of configuration Y (and/or if the set of DL subframes of the TDD UL/DL configuration X may be a superset of those of configuration Y), for example, according to one or more transition pairs (X,Y) listed in Table 6a, then the WTRU may expect to receive the corresponding PUSCH HARQ feedback in a DL subframe according to the timing of the PUSCH HARQ process of the TDD UL/DL configuration Y which may include a PUSCH transmission in the UL subframe i.

Table 6b illustrates examples of TDD UL/DL configuration transition pairs (X,Y), for which UL subframes of TDD UL/DL configuration Y are a subset of UL subframes of the TDD UL/DL configuration X. If the set of UL subframes of the TDD UL/DL configuration X may be a superset of UL subframes of configuration Y (and/or if the set of DL subframes of the TDD UL/DL configuration X may be a subset of those of configuration Y), for example, according to one or more transition pairs (X,Y) listed in Table 6b, then the WTRU may expect to receive the corresponding PUSCH HARQ feedback in the DL subframe j of the next available radio frame, for example, the first available radio frame of the new TDD UL/DL configuration Y.

TABLE 6a

| Pair (X, Y) |
| --- |
| (1, 0) |
| (1, 6) |
| (2, 0) |
| (2, 1) |
| (2, 6) |
| (3, 0) |
| (3, 6) |
| (4, 0) |
| (4, 1) |
| (4, 3) |
| (4, 6) |
| (5, 0) |
| (5, 1) |
| (5, 2) |
| (5, 3) |
| (5, 4) |
| (5, 6) |
| (6, 0) |

TABLE 6b

| Pair (X, Y) |
| --- |
| (0, 1) |
| (0, 2) |
| (0, 3) |
| (0, 4) |
| (0, 5) |
| (0, 6) |
| (1, 2) |
| (1, 4) |
| (1, 5) |
| (2, 5) |
| (3, 4) |
| (3, 5) |
| (4, 5) |
| (6, 1) |
| (6, 2) |
| (6, 3) |
| (6, 4) |
| (6, 5) |

Considering a TDD UL/DL configuration transition pair (X,Y), upon the reception of PUSCH (re-)transmission trigger (either via UL (re-)transmission grant and/or PUSCH HARQ NACK) in the DL subframe i of the last radio frame of TDD UL/DL configuration X by a WTRU, for which the WTRU might have transmitted the corresponding PUSCH in subframe j of the next radio frame according to the timing of the TDD UL/DL configuration X, the WTRU may perform at least one or a combination of the following.

The WTRU may ignore the PUSCH (re-)transmission trigger and/or may terminate the corresponding PUSCH HARQ process. The WTRU may assume a successful transmission for that HARQ process. The WTRU may, however, still keep the corresponding data in the buffer for possibly future transmission. As an example, if the subframe j may not be an UL subframe in the next TDD UL/DL configuration Y, the WTRU may ignore the PUSCH (re-)transmission request and/or may terminate the corresponding HARQ process and/or may assume a successful transmission of the PUSCH for the last transmission of that HARQ process. As another example, if the subframe i may not be a DL subframe in the next TDD UL/DL configuration Y, the WTRU may ignore the PUSCH (re-) transmission request and/or may terminate the corresponding HARQ process and/or may assume a successful transmission of the PUSCH for the last transmission of that HARQ process.

If the subframe i may be a DL subframe in a TDD UL/DL configuration Y, then the WTRU may transmit a PUSCH in an UL subframe according to the timing of the PUSCH HARQ process of the TDD UL/DL configuration Y. The PUSCH HARQ process may be the one that may include the possibility of carrying a PUSCH transmission trigger in the DL subframe i of the TDD UL/DL configuration Y.

If the subframe j may be an UL subframe in TDD UL/DL configuration Y, then the WTRU may transmit the corresponding PUSCH in the UL subframe j of the first available radio frame of TDD UL/DL configuration Y, as described above.

Once the WTRU may transmit the corresponding PUSCH in a UL subframe of the first radio frame of the new TDD UL/DL configuration Y (for example, the next available radio frame), the WTRU may follow (or use) the PUSCH HARQ process timing corresponding to the transmission of PUSCH in that UL subframe of TDD UL/DL configuration Y.

As an embodiment of the described solutions, consider the TDD UL/DL configuration pair of (X,Y), where the WTRU may receive indications to switch from TDD UL/DL configuration X to the TDD UL/DL configuration Y. In this case, upon the reception of PUSCH (re-)transmission (either via UL (re-)transmission grant and/or PUSCH HARQ NACK) in the DL subframe i of the last radio frame of TDD UL/DL configuration X by a WTRU, for which the WTRU might have transmitted the corresponding PUSCH in subframe j of the next radio frame according to the timing of the TDD UL/DL configuration X, the WTRU may perform at least one or a combination of the following.

If the set of UL subframes of the TDD UL/DL configuration X may be a subset of those of configuration Y (and/or if the set of DL subframes of the TDD UL/DL configuration X may be a superset of those of configuration Y), for example, according to one or more transition pairs (X,Y) listed in Table 6a, then the WTRU may transmit the corresponding PUSCH in the UL subframe j of the first available radio frame of TDD UL/DL configuration Y, as described above. If the set of UL subframes of the TDD UL/DL configuration X may be a superset of those of configuration Y (and/or if the set of DL subframes of the TDD UL/DL configuration X may be a subset of those of configuration Y), for example, according to one or more the transition pairs (X,Y) listed in Table 6b, then the WTRU may transmit a PUSCH in a UL subframe according to the timing of PUSCH HARQ process of the TDD UL/DL configuration Y which may include a PUSCH transmission trigger in the DL subframe i, as described above.

With respect to PRACH resource allocation, a WTRU may transmit a preamble in a PRACH resource that may not be a cell-specific PRACH resource of the cell, for example if the WTRU may be configured with a WTRU-specific TDD UL/DL configuration which may differ from the cell-specific TDD UL/DL configuration. A cell-specific PRACH resource may be one which may be provided in system information (or based on parameters provided by system information) and/or one which may be used by any WTRU which may include a legacy WTRU.

A TDD UL/DL configuration may be applicable per serving cell. Similarly, a PRACH resource allocation may be applicable per serving cell.

Methods and procedures described herein may be applicable for a serving cell of a WTRU's configuration, for example, the methods and procedures described may be applicable for operation on a PCell and/or on a SCell of the WTRU's configuration. The methods and procedures described may be applicable for a plurality of serving cells, for example, to a serving cell that may belong to a specific group of cells such as a timing advance group (TAG), or for all cells of a WTRU's configuration. A TAG may refer to group of serving cells that may be configured by RRC that, for the cells with an UL configured, may use the same timing reference cell and/or the same Timing Advance value.

The term "WTRU-specific DL subframe" may refer to a subframe in a radio frame that may correspond to an UL subframe according to the cell-specific TDD UL/DL configuration which may be applicable to a certain cell. The said subframe may be indicated to a WTRU as a DL subframe in a WTRU-specific TDD UL/DL configuration and/or in an indication of UL/DL subframe directions.

PRACH resources may be cell-specific resources since they may be derived from parameters which may be part of system information which may be broadcasted. The allocation and indexing of resources may be at least in part a function of the UL/DL TDD configuration.

With TDD, for a given PRACH configuration, each of the following may be a function of the TDD UL/DL configuration: whether or not frequency multiplexing may be used for a given subframe; if frequency multiplexing may be used, the number of PRACH resources which may be in a given subframe; and the UL subframe in the radio frame in which a PRACH resource may be present.

For example, where PRACH configuration index 0 may be signaled in SIB2 (which may represent one of the lowest PRACH densities), the following results may be obtained: if TDD UL/DL configuration 0, 3 or 6 may be used, there may be a single PRACH resource per radio frame in subframe #4; if TDD UL/DL configuration 1 or 4 may be used, there may be a single PRACH resource per radio frame in subframe #3; if TDD UL/DL configuration 2 or 5 may be used, there may be a single PRACH resource per radio frame in subframe #2.

In an embodiment, selection of one or more WTRU-specific TDD UL/DL configurations, for example by an eNB, for use in a cell, may be a function of the PRACH resource allocation. The selection may be such that the UL/DL TDD configuration may be changed for a subset of WTRUs (for example, dynamic TDD WTRUs) while keeping the PRACH allocation constant for all WTRUs in the cell. This may restrict the allowed TDD UL/DL configurations to a set in which the PRACH allocation may be similar among the configurations (for example, the set of UL/DL configurations among which switch may be performed may be [0, 3, 6]). This may be acceptable for cells with low PRACH density, but may become a limitation otherwise.

The selected WTRU-specific TDD UL/DL configurations may be a function of the PRACH resource allocation such that the corresponding WTRU-specific PRACH resources of these configurations may be either a subset of or equal to the cell-specific PRACH resources if contention based random access (CBRA) may be possible for the concerned WTRUs. This may be useful to ensure that, for example, WTRUs may not interfere with any UL transmissions from legacy WTRUs if CBRA may be possible for those WTRUs.

When all WTRUs in a cell may determine the PRACH resource allocation using the same TDD UL/DL configuration and the same PRACH configuration index, there may be no ambiguity. A problem may occur if this relationship may be broken (for example cell-specific vs. WTRU-specific configuration, and/or timing of change of TDD UL/DL configuration vs. timing of change of PRACH configuration).

There may be an impact if at least part of the WTRU population in a given cell may autonomously initiate the transmission of a preamble on a PRACH resource where the said resource may be derived from a TDD UL/DL configuration which may differ from the cell-specific configuration. For example, legacy WTRUs operating in Idle mode may derive PRACH resources from the cell-specific UL/DL TDD configuration while other WTRUs in Connected mode may derive the PRACH resources based on a WTRU-specific UL/DL TDD configuration.

Although it may be possible that different combinations of TDD UL/DL configurations and PRACH configurations may lead to the same PRACH resource allocation and indexing, it may be useful to have ways to ensure that WTRUs do not need to determine or redetermine the set of allocated PRACH resources when the UL/DL TDD configuration may change.

In one embodiment, a WTRU may receive control signaling that may change the TDD UL/DL configuration. The TDD UL/DL configuration may be WTRU-specific, and may differ from the cell-specific TDD UL/DL configuration. The control signaling may also include a PRACH configuration. The WTRU determine the new PRACH resource allocation based on the PRACH configuration.

In another embodiment, a WTRU configured with a cell-specific PRACH configuration which may be derived from a cell-specific TDD UL/DL configuration and configured with a WTRU-specific TDD UL/DL may transmit a preamble in a contention-free manner in a WTRU-specific DL subframe. The WTRU may not or may not be allowed to perform a contention-based random access in a subframe with a PRACH resource if the subframe may be a DL subframe according to a WTRU-specific configuration.

In another embodiment, a WTRU configured with a cell-specific PRACH configuration which may be derived from a cell-specific TDD UL/DL configuration and configured with a WTRU-specific TDD UL/DL may or may only transmit a preamble in WTRU-specific DL subframe for a network-initiated RACH procedure. The WTRU may not or may not be allowed to autonomously transmit a preamble in a subframe with a PRACH resource if the subframe may be a DL subframe according to a WTRU-specific configuration.

In another embodiment, a WTRU configured with a cell-specific PRACH configuration which may be derived from a cell-specific TDD UL/DL configuration and configured with a WTRU-specific TDD UL/DL may transmit a preamble in a WTRU-specific DL subframe. For example, a WTRU may prioritize transmission (or retransmission) of a preamble in a PRACH resource over DL reception in a subframe that is a DL subframe according to a WTRU-specific configuration.

In another embodiment, a WTRU configured with cell-specific PRACH configuration which may be derived from a cell-specific TDD UL/DL configuration and configured with a WTRU-specific TDD UL/DL may additionally be configured with subframe restriction for preamble transmission. Such PRACH subframe restriction may be known a priori, for example, any subframe other than subframe #2 may be restricted for preamble transmission, or it may be configured using dedicated signaling. The WTRU may or may only transmit a preamble on a PRACH resource according to the cell-specific configuration in a subframe which is not restricted for preamble transmission. The PRACH subframe restriction may be configured per WTRU-specific TDD UL/DL configuration, and may or may only be applied when the corresponding TDD UL/DL configuration may be activated. Such PRACH subframe restriction may or may only be applicable to WTRU-autonomous preamble (re) transmissions. Such PRACH subframe restriction may or may only be applicable to a random access procedure which may use a contention-based preamble. Alternatively, the restriction may be applied per PRACH resource index (for example, in both time and frequency).

In another embodiment, a WTRU may determine the PRACH resources based on the cell-specific TDD UL/DL configuration regardless of what other TDD UL/DL configurations it may have been configured with and/or what direction information it may have received regarding conflicting subframes. It may be assumed that since legacy WTRUs may use the cell-specific resources, the legacy WTRUs may not conflict with the WTRU specific configurations.

The following relates to management of WTRU-specific TDD UL/DL configurations. In one embodiment, a WTRU configured with a WTRU-specific or procedure-specific TDD UL/DL configuration may deactivate or discard the configuration and/or revert to the cell-specific TDD UL/DL configuration when the Timing Alignment Timer (TAT) may expire or may have expired. In another embodiment, a WTRU may deactivate or discard a previously configured WTRU/procedure-specific TDD UL/DL configuration and/ or revert to the cell-specific TDD UL/DL configuration upon (or as a result of) scheduling request failure on a dedicated PUCCH resource (D-SR failure). This may be useful to preclude spurious preamble transmission on PRACH in a WTRU-specific DL subframe, since the WTRU may invalidate dedicated PUCCH resources for scheduling request when TAT may expire or may have expired, in which case WTRU-autonomous preamble transmission may become possible. In another embodiment, a WTRU may deactivate or discard a previously configured WTRU/procedure-specific TDD UL/DL configuration and/or revert to the cell-specific TDD UL/DL configuration when it may determine that the WTRU may be experiencing radio link problems (or for example, when the WTRU may start timer T310). In another embodiment, a WTRU may deactivate or discard a previously configured WTRU/procedure-specific TDD UL/DL configuration and/or revert to the cell-specific TDD UL/DL configuration when the WTRU may determine radio link failure (RLF) (or for example, when timer T310 may expire). This may be useful since RLF may typically trigger WTRU-autonomous preamble transmission on PRACH for an RRC Connection Re-establishment procedure. In another embodiment, a WTRU may deactivate or discard a previously configured WTRU/procedure-specific TDD UL/DL configuration and/or revert to the cell-specific TDD UL/DL configuration when RRC may perform for the WTRU a transition away from Connected mode, for example, a transition to Idle mode. This may be useful since the WTRU may no longer have a dedicated RRC connection to the network and may no longer use any WTRU-specific configuration.

In another embodiment, a WTRU may deactivate or discard a previously configured WTRU/procedure-specific TDD UL/DL configuration and/or revert to the cell-specific TDD UL/DL configuration for the concerned serving SCell when the SCell may be deactivated. In another embodiment a WTRU may or may only use the cell-specific TDD UL/DL configuration for the concerned service S Cell upon activation of the concerned cell. Alternatively, if the WTRU may be configured with a WTRU/procedure-specific TDD UL/DL configuration for the S Cell, for example prior to SCell activation, the WTRU may operate with that configuration upon activation of the SCell (which may be in addition to operating with the cell-specific TDD UL/DL configuration).

In another embodiment, a WTRU may suspend, or deactivate, or blank a configured UL grant or allocation (for example, UL SPS) when it may receive signaling which may configure and/or activate a WTRU-specific TDD UL/DL configuration or which may change UL/DL subframe directions. This may or may only apply for a SPS configuration or allocation that may correspond to a transmission in a WTRU-specific DL subframe or to a subframe which may change direction as a result of the new configuration or subframe directions. The WTRU may remove the configured UL grant or allocation from its configuration.

For one or more scenarios such as those described herein, one or more of the following may apply. If the WTRU may be configured with a WTRU-specific or procedure-specific TDD UL/DL configuration via higher layer signaling, the WTRU may continue to use this configuration after a condition occurs, for example, after the TAT expires, D-SR failure, RLF, and the like. If the WTRU may be configured with a WTRU-specific or procedure-specific TDD UL/DL configuration or subframe directions via physical layer signaling, the WTRU may, when the condition occurs, revert to the cell-specific TDD UL/DL configuration or a WTRU-specific or procedure-specific TDD UL/DL configuration which may have been provided via higher layer signaling, for example, when or after TAT expires, D-SR failure, RLF, and the like.

The following relates to means by which a WTRU may receive and/or determine one or more of conflicting subframes, directions of conflicting subframes, procedure-specific and/or WTRU-specific TDD UL/DL configurations.

An eNB may transmit and/or a WTRU may receive signaling which may be referred to as dynamic TDD control signaling which may provide one or more procedure-specific and/or WTRU-specific TDD UL/DL configurations and/or UL/DL subframe directions or parameters from which one or more of these configurations or directions may be determined. In examples in which a WTRU may receive control signaling (for example dynamic TDD control signaling) the control signaling may be transmitted by an eNB. In some embodiments, control signaling may be or may include dynamic TDD control signaling.

A WTRU may receive dynamic TDD control signaling according to at least one of the following means. Dynamic TDD control signaling for different purposes (e.g., to provide a WTRU-specific TDD UL/DL configuration or to provide subframe directions) may use different means. A WTRU may receive dynamic TDD control signaling from system information broadcast. This may, for example, be applicable to and/or receivable by WTRUs which may be in Connected mode or Idle mode. The dynamic TDD control signaling may be received by a SIB update mechanism, for example, an update to a SIB such as one other than SIB1 and may be received by or only by WTRUs that may decode such SIB. For example, this may be applicable to or only to WTRUs that may support dynamic TDD or a WTRU-specific and/or procedure-specific TDD UL/DL configuration. A WTRU may receive dynamic TDD control signaling via RRC dedicated or WTRU-specific signaling which may be directed to or intended for one or a group of WTRUs. As an example, dynamic TDD control signaling may be part of an RRC Connection Reconfiguration. Dynamic TDD control signaling may be received by a WTRU over a signaling radio bearer. An UL/DL configuration received in dynamic TDD control signaling may override the cell-specific configuration, and/or may be stored for later activation using additional control signaling (for example additional dynamic TDD control signaling). An UL/DL configuration received in dynamic TDD control signaling may be used in addition to the cell-specific configuration and/or may be stored.

A WTRU may receive dynamic TDD control signaling in a MAC Control Element (CE). The MAC CE may indicate a configuration or an action for a configuration (for example activate or deactivate) which may relate to a configuration previously received by RRC (for example, using dedicated signaling) and stored.

A WTRU may receive dynamic TDD control signaling via physical layer signaling such as via PDCCH or EPDCCH which may be in PDCCH or EPDCCH Common Search Space (CSS). The control signaling may be received in a DCI scrambled by an RNTI (for example, a TDD-RNTI) which may be a common RNTI, for example an RNTI that may be used by multiple WTRUs such that the TDD dynamic control signaling may be received by multiple WTRUs at the same time. The indicated configuration may relate to a configuration previously received by RRC (for example, using broadcast or dedicated signaling) which the WTRU may have stored. This may enable a network node such as the eNB to control multiple WTRUs in a serving cell using common control signaling. Such signaling may or may only be received in a specific subframe, such as subframe #0. The signaling may or may always use a specific Aggregation Level (AL), for example, AL8 for robustness. Alternatively, a C-RNTI and WTRU-specific Search Space may be used and the dynamic TDD control signaling may be received in a DCI scrambled by the WTRU's C-RNTI. The WTRU may transmit a HARQ ACK upon successful reception of such a DCI. The physical layer signaling (which may be common or WTRU-specific) may indicate a configuration (for example UL/DL directions) or action which may relate to a configuration previously received by RRC (for example, using dedicated signaling) which the WTRU may have stored.

A WTRU may receive indication of UL/DL assignment and/or activation or deactivation of an UL/DL transition or a TDD UL/DL configuration in one or a combination of the following techniques. Reception by a WTRU may imply transmission by an eNB.

A WTRU may receive a PDCCH or EPDCCH DCI format which may indicate the activation or deactivation of one or more of an UL/DL transition, an UL/DL assignment, or a TDD UL/DL configuration. For example, the UL/DL assignment may be controlled by physical layer signaling, e.g. following a "DL activation/deactivation" principle. This (e.g., the activation or deactivation of the UL/DL assignment) may be applicable starting from subframe n+x, where x may be a fixed processing time or may be indicated in the received DCI and n may the subframe in which the DCI may be received or the subframe in which the DCI reception may be positively acknowledged. The activation or deactivation may be applicable starting from the next radio frame (for example not overlapping with any subframe that may be part of additional applicable delay). The DCI format may be received using a specific RNTI possibly configured by RRC (for example, this may enable switching for multiple WTRUs at once). The DCI may be received in the common search space of the PDCCH or EPDCCH (for example, this may enable switching for multiple WTRUs at once).

A WTRU may receive a MAC CE which may indicate the activation or deactivation of one or more of an UL/DL transition, and UL/DL assignment, or a TDD UL/DL configuration. For example, the UL/DL assignment may be controlled by MAC signaling, e.g. following a "DL activation/deactivation" principle. This (e.g., the activation or deactivation of the UL/DL assignment) may be applicable starting from subframe n+x, where x may be a fixed processing time or may be indicated in the received MAC CE and n may be the subframe in which the transport block containing the MAC CE may be successfully decoded or the subframe in which the transport block containing the MAC CE may be positively acknowledged. Alternatively, it may be applicable starting from the next radio frame.

A WTRU may receive RRC signaling which may indicate the activation or deactivation and/or configuration or reconfiguration of one or more of an UL/DL transition, and UL/DL assignment, or a TDD UL/DL configuration. For example, the UL/DL assignment may be controlled by RRC signaling.

This (e.g., activation or deactivation and/or configuration or reconfiguration) may be applicable starting from the start of the next SysInfo update period (for example if the signaling may be received on BCCH), or from the start of a radio frame corresponding to SFN mod x, where x may be a fixed value or may be indicated in the received RRC PDU. Alternatively, this may be applicable starting from subframe n+x, where x may be a fixed processing time (e.g., related to RRC PDU processing time) or may be indicated in the received signaling; n may be the subframe in which the transport block containing the RRC PDU may be successfully decoded or the subframe in which the transport block containing the RRC PDU may be positively acknowledged.

UL/DL assignment may be used to represent the designation of which subframes are UL and which are DL (for example, the direction of the subframes in a frame) which may be in any form such as identification of a TDD UL/DL configuration, identification of UL/DL or DL/UL transitions, identification of direction for conflicting subframes, and the like.

Activation of an UL/DL assignment may mean enabling use of, requesting or requiring use of, or indicating to use or to start to use the assignment. An activation may be applicable until a deactivation or another activation may be received or an activation may be applicable for a fixed amount of time such as one frame (for example, the frame in which the activation may be received or the next frame) or n frames (for example, 4 frames) which may begin in the frame in which the activation may be received or the next frame.

Deactivation of an UL/DL assignment may mean disabling use of, requesting or requiring stopping use of, or indicating to not use the assignment. If activation may be valid for a fixed amount of time, following that time, the WTRU may autonomously deactivate the assignment.

A WTRU may receive or attempt to receive control signaling which may be or may include dynamic TDD control signaling in a DL subframe according to at least one of the following.

A WTRU may receive or attempt to receive control signaling which may be or may include dynamic TDD control signaling in a DL subframe according to the active TDD UL/DL configuration. This may apply or only apply for such control signaling which may be received via PDCCH or EPDCCH (which may be in PDCCH or EPDCCH WTRU-specific Search Space) in a DCI format which may be scrambled with C-RNTI.

A WTRU may receive or attempt to receive control signaling which may be or may include dynamic TDD control signaling in or only in DL subframes according to the cell-specific TDD UL/DL configuration. This may apply or only apply for such control signaling which may be received via PDCCH or EPDCCH (which may be in PDCCH or EPDCCH WTRU-specific Search Space) in a DCI format which may be scrambled with C-RNTI.

A WTRU may receive or attempt to receive control signaling which may be or may include dynamic TDD control signaling in a specific DL subframe, for example, in subframe #0 or in subframe #5. This may apply or only apply for such control signaling which may be received via PDCCH or EPDCCH CSS.

A WTRU may decode for (for example, monitor for and/or attempt to decode PDCCH or EPDCCH with DCI format for) dynamic TDD control signaling once per frame, or according to a (possibly configured) period. This may apply or only apply for such control signaling which may be received via PDCCH or EPDCCH CSS.

A WTRU may decode for (for example, monitor for and/or attempt to decode PDCCH or EPDCCH with DCI format for) dynamic TDD control signaling in specific radio frames, for example, in subframes that corresponds to, e.g., SFN mod X (where X may be specified or configurable). This may apply or only apply for such control signaling which may be received via PDCCH or EPDCCH CSS.

A WTRU may receive dynamic TDD control signaling (for example, in subframe n), and may apply the resulting subframe directions and/or TDD UL/DL configuration and/or adjust the concerned transmission/reception operation according certain timing. For example, a signaled change may be applicable starting from at least one of: a) the next DL to UL transition (for example, if received in subframe #0, a new configuration may apply in subframe #1 or #2); b) the start of the next radio frame (possibly after additional delays); c) after a WTRU processing time from subframe n, for example, 1 ms for an unacknowledged PDCCH signal, 4 ms for an acknowledged PDCCH signal, 8 ms for a MAC CE, 15 ms for a RRC signal; d) a subframe after the subframe in which the WTRU may have transmitted ACK for the corresponding signaling; e) a eNB processing time, for example 4 ms after a subframe in which the WTRU may have transmitted a HARQ ACK applicable to the concerned control signal; f) after a delay which may be signaled in the control signaling itself and applied, for example, from subframe n; or g) combination(s) of the above.

In one embodiment, the WTRU may use the WTRU-specific and/or procedure-specific TDD UL/DL configuration until a validity time has expired, if applicable (for example, at which time the WTRU may revert to a default configuration which may be the cell-specific TDD UL/DL configuration).

In one embodiment, the WTRU may use the WTRU-specific and/or procedure-specific TDD UL/DL configuration until a TAT applicable to the concerned cell may expire or may have expired, or until any error condition occurs (for example, at which time the WTRU may revert to a default configuration which may be the cell-specific TDD UL/DL configuration).

A WTRU may expect to receive subframe directions or a WTRU-specific or procedure-specific TDD UL/DL configuration, such as one that may determine the subframe directions or the direction of conflicting subframes at certain times or within certain time windows. In case the WTRU may not receive the expected information, the WTRU may use a predetermined (for example, default) configuration or directions.

For example, one or more of the following may apply. A WTRU may expect one or more physical layer signals to carry the indication of a WTRU/procedure-specific configuration or the UL/DL subframe directions at a predetermined or preconfigured time and/or frequency resource(s) and/or within a predetermined or preconfigured time window. The WTRU may expect to receive the index or other identification of the TDD UL/DL configuration itself or a bitmap or other representation indicating subframe directions. A WTRU may expect to receive such indication through a DCI format or message which may be transmitted (for example by the eNB) at a specific subframe within the radio frame, for example, the subframe m (such as m=0 which may indicate the first subframe of the radio frame) of each n radio frames or within a predefined or preconfigured time window. Another expected pattern may be used which may enable the WTRU to know when to look for the indication of a WTRU/procedure-specific configuration or the UL/DL subframe directions.

A WTRU may need to continuously (for example, in the designated subframes) search for one or more physical layer signals carrying the indication of one or more WTRU/procedure-specific TDD UL/DL configurations or UL/DL subframe directions.

Upon reception of the indication of WTRU/procedure-specific TDD UL/DL configuration or UL/DL subframe directions, the WTRU may acknowledge this reception potentially through a physical layer and/or higher layer signaling to its serving cell.

Upon reception of the indication of WTRU/procedure-specific TDD UL/DL configuration or UL/DL subframe directions, the WTRU may apply the directions or directions indicated by the configuration according to one or more of the rules described herein such as to start in the frame in which the indication is received or the next frame.

If a WTRU which may be expecting to receive a physical layer signal indicating a WTRU/procedure-specific TDD UL/DL configuration or UL/DL subframe directions may not receive and/or may not correctly decode such indication, then the WTRU may use one or a combination of the following to determine subframe directions or the TDD UL/DL configuration to apply until it may receive an indication such as the next indication which may be signaled.

The WTRU may use the cell-specific TDD UL/DL configuration for the subframe directions and/or the operations (for example, procedures and/or timing) related to the missed WTRU/procedure-specific TDD UL/DL configuration, such as the one which may be provided by SIB1.

The WTRU may use a preconfigured WTRU/procedure-specific TDD UL/DL configuration for the subframe directions and/or the operations (for example, procedures and/or timing) related to the missed WTRU/procedure-specific TDD UL/DL configuration, for example, one provided by RRC signaling or the one which may be used as a reference configuration for DL-related procedures which may have been provided by RRC signaling, and the like.

The WTRU may determine the UL/DL subframe directions or the TDD UL/DL configuration to use in place of the missed configuration, which may be identified by its index, as a function of several factors such as one or more configuration parameters, cell-specific configuration, one or more received/configured WTRU/procedure-specific configurations, and the like.

The WTRU may blind decode for (e.g., monitor and/or attempt to decode) PDCCH or EPDCCH intended for the WTRU in all or certain cell-specific UL subframes to determine whether the subframe may be intended to be DL for that WTRU. The certain subframes may be those for which the WTRU may not be scheduled to transmit in the UL or may be determined according to one or more of the rules or procedures described herein. Upon successful receipt of such PDCCH or EPDCCH, the WTRU may act accordingly, for example, attempt to receive the corresponding PDSCH or schedule corresponding PUSCH, and the like.

The WTRU may transmit in one or certain potential UL subframes, for example, the subframes for which the WTRU may be scheduled to transmit and/or for which the eNB may expect to receive UL data and/or signaling from the WTRU, possibly according to the rules and mechanisms described herein.

In case of missed signaling, the WTRU may apply the determined WTRU/procedure-specific TDD UL/DL configuration or UL/DL subframe directions according to the same rules it may ordinarily follow for when to apply a signaled WTRU/procedure-specific TDD UL/DL configuration or UL/DL subframe directions (for example, same frame, next frame, same reconfiguration period, next reconfiguration period, and the like). The starting point for determining when to apply the determined WTRU/procedure-specific TDD UL/DL configuration or UL/DL subframe directions may be the subframe or frame in which the WTRU may have missed, or understood it may have missed the signaling it may have been expecting.

The following relates to HARQ feedback resource allocation and signaling. Different WTRUs may assume different TDD UL/DL configurations, while all may access almost the same set of physical resources in the system. As an example, two WTRUs may use different TDD UL/DL configurations for PUSCH-HARQ related operations (for example, they may use different timing for UL grant, PUSCH transmission and PHICH feedback). In this case, although these WTRUs may receive their corresponding UL grants in different subframes, upon the transmission of their PUSCH they may need to receive the corresponding PHICH feedback in the same DL subframe and possibly on the same PHICH index pair. A similar situation may exist for PDSCH-HARQ related operation, where different WTRUs may need to use the same set of PUCCH resources to provide their corresponding PDSCH-related HARQ feedback. The behavior of the WTRU and/or eNB may need to be addressed for situations which may include these. One or more of the following mechanisms may be used.

Different WTRUs may follow (or use) the PDSCH-HARQ operation and/or timing of different TDD UL/DL configurations. In the following example, there may be at least two groups of WTRUs where each may follow (or use) a different TDD UL/DL configuration, for example Group 1 WTRUs and Group 2 WTRUs. The eNB may schedule the WTRUs in Group 1 and Group 2 in a way that no two WTRUs may send their PUCCH using the same exact PUCCH index in the same UL subframe. The eNB may, for example, assign different PUCCH index configuration parameters to WTRUs in Group 1 and Group 2.

The eNB may assign WTRUs in different groups with different sets of PUCCH resources. For example, the WTRUs may be configured with different PUCCH bandwidths. The WTRUs in Group 1 (which may be legacy WTRUs) may be configured with $(N_{RB\_G1}^{(2)})$, and the WTRUs in Group 2 (such as dynamic TDD WTRUs) may be configured with $(N_{RB\_G2}^{(2)})$, where $(N_{RB\_G1}^{(2)})$ and $(N_{RB\_G2}^{(2)})$ may be configuration parameters denoting the bandwidth in terms of RBs that may be available for use by PUCCH. Group 2 WTRUs may receive both configuration parameters.

Group 2 WTRUs may skip the first $(N_{RB\_G1}^{(2)})$ PUCCH resources on the edge of the bandwidth and only use the $(N_{RB\_G2}^{(2)})$ PUCCH resources after the skipped ones. The eNB may not schedule any UL transmission (e.g., PUSCH transmission) for either group of WTRUs in the UL resources which may overlap with any of those configured PUCCH resources, for example, $(N_{RB\_G2}^{(2)}+N_{RB\_G1}^{(2)})$ PUCCH resources.

Group 2 WTRUs may skip the first $(N_{RB\_G1}^{(2)})$ PUCCH resources on the edge of the bandwidth and only use the $(N_{RB\_G2}^{(2)}-N_{RB\_G1}^{(2)})$ PUCCH resources after the skipped ones. The eNB may not schedule any UL transmission (e.g., PUSCH transmission) for either group of WTRUs in the UL resources which may overlap with any of those configured PUCCH resources, for example, $(N_{RB\_G2}^{(2)})$.

For PHICH operation, different WTRUs may follow (or use) the PUSCH-HARQ operation and/or timing of different TDD UL/DL configurations. In the following example there may be at least two groups of WTRUs where each may follow (or use) a different TDD UL/DL configuration, for example Group 1 WTRUs and Group 2 WTRUs. In one embodiment, the eNB may schedule the WTRUs in Group 1 and Group 2 in a way that no two WTRUs may expect their PHICH on the same exact PHICH index pair in the same UL subframe. In another embodiment, two WTRUs may receive PHICH with the same PHICH index pair and/or within the same DL subframe. The eNB may bundle the PUSCH-HARQ ACK/NACK bits of two or more WTRUs. The eNB may determine the bundled bit as the logical AND of the individual WTRU's PUSCH-HARQ ACK/NACK where ACK bit may be represented by '1' and NACK bit may be represented by '0'. For example, the eNB may transmit an ACK bit only if all corresponding PUSCHs are received and decoded correctly. Otherwise, it may transmit a NACK bit, which may require all corresponding WTRUs to retransmit their UL data.

An example of an embodiment of the mechanisms and techniques described herein is as follows. Components of the example may be performed in any order in whole or in part. In this example, the WTRU may follow a WTRU-specific TDD UL/DL configuration for PDSCH and its related HARQ.

SIB1 may carry a cell-specific TDD UL/DL configuration (for example, config_cell) which WTRUs may receive via broadcast signaling. WTRUs such as dynamic TDD WTRUs may receive another TDD UL/DL configuration such as a WTRU-specific or procedure-specific TDD UL/DL configuration (for example, config_wtru_1), which may be different from config_cell. For example, the config_cell and config_wtru_1 pair may be selected in a way that the UL subframes indicated by config_wtru_1 may be a subset of UL subframes indicated by config_cell. A WTRU may receive and/or determine config_wtru_1 or any other WTRU-specific or procedure-specific TDD UL/DL configuration using any methods and/or procedures such as those described herein.

A WTRU may use config_cell as a reference for UL scheduling and/or UL scheduling timing and/or PUSCH HARQ timing.

UL scheduling may include one or more of receiving UL grants in the indicated DL subframes and using the timing relationship between the subframe in which the UL grant (or UL HARQ feedback through PHICH) may be received and the corresponding subframe in which resources may be allocated for UL data transmission (or re-transmission). UL scheduling timing may include the timing (or timing relationship) between the subframe in which an UL grant (or UL HARQ feedback through PHICH) may be received and the corresponding subframe in which resources may be allocated for UL data transmission (or re-transmission). PUSCH HARQ timing may include the timing (or timing relationship) between the transmission of the UL data (e.g., the subframe of the UL transmission) and the reception of (or the subframe for the reception of) its corresponding HARQ feedback, for example, PHICH.

Conflicting subframes may consist of subframes which may be marked UL in config_cell and DL in config_wtru_1.

A WTRU may monitor PDCCH and/or EPDCCH and/or may receive a PDSCH grant and its corresponding PDSCH transmission in a subframe which may be indicated as a DL subframe in both config_cell and config_wtru_1.

A WTRU may also monitor PDCCH and/or EPDCCH and/or may receive a PDSCH grant and its corresponding PDSCH transmission in a subframe which may be indicated as DL by a WTRU-specific or procedure-specific TDD configuration, for example, config_wtru_1, where such subframe may be indicated as an UL subframe in config_cell.

A WTRU may not expect a PDSCH grant and its corresponding PDSCH transmission in a subframe in which the WTRU has been implicitly and/or explicitly requested to perform an UL transmission.

Upon the reception and/or detection of a PDSCH grant by a WTRU in a conflicting subframe corresponding to config_wtru_1, the WTRU may not perform any UL transmission in that subframe.

A WTRU may monitor PDCCH and/or EPDCCH and/or receive a PDSCH grant and it corresponding PDSCH transmission in a conflicting subframe.

The eNB may not expect to receive any signal from WTRUs in a subframe indicated as a DL subframe in the cell-specific TDD UL/DL configuration. WTRUs may not transmit any signal in a subframe indicated as a DL subframe in the cell-specific TDD UL/DL configuration.

A WTRU may determine the UL/DL direction of one or a set of subframes, following procedures such as those described herein.

A WTRU may provide the HARQ feedback for a PDSCH reception according to the timing of a reference WTRU-specific or procedure-specific TDD UL/DL configuration, for example, config_wtru_2. This TDD UL/DL configuration, for example, config_wtru_2, may be the same as that of config_wtru_1. In this case both configurations may be indicated by a single WTRU/procedure-specific TDD UL/DL configuration, for example, config_wtru_1.

For a given WTRU, the eNB may follow (or use) the same subframe directions and/or timing relationships for scheduling and/or HARQ as that WTRU.

Another example of an embodiment to implement the mechanisms and techniques described herein is as follows, Components of the example may be performed in any order in whole or in part. In this example, the WTRU may follow (or use) WTRU-specific TDD UL/DL configuration for certain procedures.

WTRUs such as dynamic TDD WTRUs may receive config_cell TDD UL/DL configuration via SIB1. The WTRUs may receive a WTRU/procedure-specific TDD UL/DL configuration, for example, config_wtru_1, which may be different from config_cell. For example, the config_cell and config_wtru_1 pair may be selected in a way such that the UL subframes indicated by config_wtru_1 may be a subset of UL subframes indicated by config_cell. The WTRU may receive and/or determine config_wtru_1 and/or any other WTRU/procedure-specific TDD UL/DL configuration using the procedures described herein.

Conflicting subframes may consist of subframes which are marked UL in config_cell and DL in config_wtru_1.

The WTRUs may use config_wtru_1 for the reference timing and/or opportunity rules for UL scheduling (for example, the timing between the reception of the UL grant and corresponding transmission or allocation for transmission of the UL data) and/or PUSCH HARQ timing (for example, the timing between the transmission of the UL data and the reception of its corresponding HARQ feedback, such as PHICH) and/or UL retransmission (for example, the timing between the reception of the UL HARQ feedback (such as PHICH) and potential re-transmission of the UL data).

The WTRUs may use config_wtru_1 or another WTRU/procedure-specific TDD UL/DL configuration for timing and/or opportunity rules for PDSCH reception and PDSCH HARQ timing.

The WTRUs may expect PDSCH and its granting PDCCH or EPDCCH in one or some conflicting subframes, which may change from one radio frame to another radio frame, possibly controlled by the eNB scheduler.

The WTRUs may not transmit in one or some conflicting subframes, which may change from one radio frame to another radio frame, possibly controlled by the eNB scheduler.

Certain subframes which may or may always be considered by legacy WTRUs to be UL subframes, may also be or always be considered as UL subframes by dynamic TDD WTRUs.

The eNB may not expect to receive any signal from WTRUs in a subframe indicated as a DL subframe in the cell-specific TDD UL/DL configuration. WTRUs may not transmit any signal in a subframe indicated as a DL subframe in the cell-specific TDD UL/DL configuration.

The WTRU may determine the UL/DL direction of one or a set of subframes, following the procedures described herein.

In another embodiment, the WTRU may use the cell-specific TDD UL/DL configuration, config_cell, and two WTRU-specific or procedure-specific UL/DL configurations, config_wtru1 and config_wtru2. One or more of the following may apply.

The WTRU may use config_cell for the UL scheduling and/or UL HARQ timing relationships. The WTRU may use config_cell for determining one or more of DRX cycles, paging occasions, and PRACH resources. The WTRU may use config_wtru1 for the DL scheduling and/or DL HARQ timing relationships. The WTRU may use config_wtru2 for the subframe directions in a given frame. The UL subframes in config_wtru1 and/or config_wtru2 may be a subset of the UL subframes in config_cell. The DL subframes in config_wtru2 may be a subset of the DL subframes in config_wtru1. The configurations config_wtru1 and config_wtru2 may be provided by the eNB to the WTRU by physical layer, MAC, or RRC signaling and they may be provided by different signaling. For example, config_wtru1 may be provided by RRC signaling and config_wtru2 may be provided by physical layer signaling, for example, so config_wtru2 may be changed at a faster rate than config_wtru1. The WTRU may monitor for and expect to receive config_wtru2 in a DCI format in a certain subframe of certain frames such as in subframe 0 of every nth frame where for example n may be 1, 4, or configurable or the pattern of subframes and/or frames may be configurable. If the WTRU may not receive or may miss an expected config_wtru2, the WTRU may use the subframe directions as defined by config_wtru1 or config_cell, and may do so until it may receive a valid config_wtru2. The WTRU may monitor PDCCH and/or EPDCCH in subframes it may understand to be DL subframes. Instead of using a TDD UL/DL configuration to indicate the subframe directions or the directions of the conflicting subframes between config_wtru1 and config_cell, an indication of the directions may be used (for example, a bit map, an index into a table of subframe combinations, and the like).

As an alternative to using a TDD UL/DL configuration to indicate the subframe directions, config_wtru2 may represent another means to convey the subframe directions or the directions of conflicting subframes between config_cell and config_wtru1, for example a bitmap or an index to a table or list of allowed subframe direction combinations may be used.

As yet another example of an embodiment to implement the mechanisms and techniques described herein, control signaling may be used to toggle the state of subframe #6. A WTRU which may support operation with a WTRU-specific TDD UL/DL configuration (which capability may be reported as part of the WTRU capability exchange), may be configured via the reception of broadcasted signaling with a cell-specific TDD UL/DL configuration. The WTRU may also be configured with a WTRU-specific TDD UL/DL configuration by dedicated RRC signaling.

The WTRU's received TDD UL/DL configuration(s), possibly received via broadcast and/or RRC signaling, for example from an eNB may be according to the following. The WTRU-specific TDD UL/DL configuration may be one of configurations 3, 4 and 5.

Once a WTRU-specific TDD UL/DL configuration may be configured, the WTRU may only transmit UL HARQ feedback in UL subframes in the first half of a radio frame. This may be applicable independently of whether the cell-specific TDD UL/DL configuration or the WTRU-specific UL/DL TDD configuration may be used by the WTRU. For example, the timing of the HARQ feedback may always follow (or use) one of the base configurations 3, 4, or 5, whichever may be the one that is configured as the WTRU-specific TDD UL/DL configuration. Possibly, PUCCH format 3 may be configured in such case. This may make PUCCH transmissions stable and independent of current TDD UL/DL configuration. This may also be applicable more generally to any type of UL transmission, for example, CSI and also to SRS, D-SR according to a configuration aspect controlled by the eNB.

Once a WTRU-specific TDD UL/DL configuration is configured, the timing of the dynamic TDD control signaling for (UL) scheduling may or may always follow (or use) the active TDD UL/DL configuration (cell-specific or WTRU specific).

Once a WTRU-specific TDD UL/DL configuration is configured, the timing of the control signaling for PHICH (or EPHICH, whichever is applicable) may or may always follow (or use) the cell-specific UL/DL TDD allocation.

Control signaling may be used to toggle subframe #6 between a normal DL subframe and a special subframe (for example, a subframe with DwPTS). The control signaling may be applied after a processing delay at the start of the next radio frame boundary.

For a given radio frame, if the state of subframe #6 may be that of a special subframe, the WTRU may consider that the UL/DL configuration may be according to the cell-specific UL/DL TDD configuration and may perform the corresponding DL to UL transition in the second half of the radio frame.

For a given radio frame, if the state of subframe #6 may be that of a normal DL subframe, the WTRU may consider that the UL/DL configuration may be according to the WTRU-specific UL/DL TDD configuration, for example, the WTRU may not perform any DL to UL transition in the second half of the radio frame.

For the purpose of measurements, the WTRU may implicitly derive the subframe restriction based on the cell-specific TDD configuration.

From a network perspective, certain WTRUs such as all WTRUs (which may include legacy WTRUs) may for example be configured with a cell-specific TDD UL/DL configuration which may correspond to configuration #1. WTRUs that may support WTRU-specific TDD UL/DL operation may be configured with configuration #4.

As another example of an embodiment to implement the mechanisms and described herein, the WTRU may perform at least one of the following operations in a WTRU-specific DL subframe. Whether or not a given DL procedure may be performed for a certain subframe may be a function of the direction of the subframe when the procedure may be performed. For example, a WTRU may or may always perform RLM-related measurements (for example, in-synch/out-synch evaluations) in such a subframe. Alternatively, the WTRU may not or may never consider such a subframe for such measurements. Alternatively, whether or not such measurements may be performed may be based on configuration. As another example, for RSRP measurements, the WTRU may or may always consider such a subframe, may not or may never consider such a subframe, or whether or not such measurements may be performed may be based on configuration. As a third example, for DL path loss estimation, the WTRU may or may always consider such a subframe, may not or may never consider such a subframe, or whether or not such measurements are performed may be a based on configuration.

As another example of an embodiment to implement the methods described herein, the transition procedures of the ongoing UL HARQ processes from the last radio frame of the previous TDD UL/DL configuration to the next (for example, first) available radio frame of the new TDD UL/DL configuration, with the possibility of suspending one or some UL HARQ processes, may depend on the pair of the previous TDD UL/DL configuration, for example, configuration X, and the new TDD UL/DL configuration, for example, configuration Y. Hereafter, the pair of TDD UL/DL configurations (X,Y) may be referred to as a transition pair, unless otherwise stated.

An UL grant for initial UL transmission and/or UL retransmission in the last radio frame of the TDD UL/DL configuration X may be ignored by the WTRU, if it requests a PUSCH transmission in the next radio frame.

A UL HARQ process may consist of a series of PUSCH transmissions and PHICH/UL-grant receptions by the WTRU.

A UL HARQ process in the last radio frame of TDD UL/DL configuration X, may be mapped into a HARQ process of the TDD UL/DL configuration Y and may be continued in the first radio frame of the TDD UL/DL configuration Y, if at least one or a combination of the following scenarios occurs.

In a first scenario, the WTRU may receive PUSCH HARQ feedback (for example PHICH) in the last radio frame of configuration X. This scenario may apply when at least one or a combination of the following conditions may happen: 1) In the last radio frame of TDD UL/DL configuration X the WTRU may have received a UL HARQ feedback (such as PHICH) in a subframe, for example, subframe n, which may have triggered a PUSCH retransmission in the next radio frame according to the timing of TDD UL/DL configuration X. 2) Subframe n (as described above) in TDD UL/DL configuration Y may contain at least one PHICH resource, which may have potentially contained a PHICH for a PUSCH transmission in the previous radio frame according to the timing of the TDD UL/DL configuration Y.

In this case the WTRU may interpret the received UL HARQ feedback as a UL HARQ feedback received according to the timing of the TDD UL/DL configuration Y and the WTRU may retransmit the PUSCH in the first radio frame of the TDD UL/DL configuration Y based on the timing of the TDD UL/DL configuration Y, with possibly a few radio frames skipped during the transition as described in this document.

In a second scenario, the WTRU may transmit a PUSCH in the last radio frame of configuration X. This scenario may apply when at least one or a combination of the following conditions may happen: 1) In the last radio frame of TDD UL/DL configuration X the WTRU may have transmitted a PUSCH in a UL subframe, for example, UL subframe n, in which the WTRU may have been expecting a UL HARQ feedback (such as PHICH) in the next radio frame according to the TDD UL/DL configuration X. 2) Subframe n (as described above) in TDD UL/DL configuration Y may be a UL subframe, which may have contained a PUSCH retransmission triggered by a UL HARQ feedback (for example, PHICH) and/or UL grant in the previous radio frame according to the timing of TDD UL/DL configuration Y.

In this case the WTRU may interpret the transmitted PUSCH as a PUSCH transmitted according to the timing of the TDD UL/DL configuration Y and the WTRU may expect the corresponding UL HARQ feedback (for example, PHICH) in the first radio frame of the TDD UL/DL configuration Y based on the timing of the TDD UL/DL configuration Y, with possibly a few radio frames skipped during the transition as described in this document.

Table 7a illustrates examples of the maximum number of UL HARQ processes which may be transferred from TDD UL/DL configuration X to TDD UL/DL configuration Y when the WTRU may follow (or use) the timing of TDD UL/DL configuration Y during the transition. Considering the above scenarios and provided solutions, the maximum number of transferred UL HARQ processes may be calculated for each pair of X and Y TDD UL/DL configurations and may be as shown in Table 7a.

TABLE 7a

| Pair (X, Y) | Y = 0 | Y = 1 | Y = 2 | Y = 3 | Y = 4 | Y = 5 | Y = 6 |
| --- | --- | --- | --- | --- | --- | --- | --- |
| X = 0 | — | 3 | 1 | 1 | 0 | 0 | 5 |
| X = 1 | 3 | — | 1 | 1 | 1 | 0 | 4 |
| X = 2 | 1 | 1 | — | 1 | 1 | 1 | 1 |
| X = 3 | 1 | 1 | 1 | — | 2 | 1 | 2 |
| X = 4 | 0 | 1 | 1 | 2 | — | 1 | 1 |
| X = 5 | 0 | 0 | 1 | 1 | 1 | — | 0 |
| X = 6 | 5 | 4 | 1 | 2 | 1 | 0 | — |

In another example, WTRU behavior during the UL HARQ process transition may include the WTRU following the timing of the previous TDD UL/DL configuration.

The transition procedures of the ongoing UL HARQ processes from the last radio frame of the previous TDD UL/DL configuration to the next (for example, first) available radio frame of the new TDD UL/DL configuration, with the possibility of suspending one or some UL HARQ processes, may depend on the pair of the previous TDD UL/DL configuration, for example, configuration X, and the new TDD UL/DL configuration, for example, configuration Y. Hereafter, the pair of TDD UL/DL configurations (X,Y) may be referred to as a transition pair, unless otherwise stated.

An UL grant for initial UL transmission and/or UL retransmission in the last radio frame of the TDD UL/DL configuration X may be ignored by the WTRU, if the WTRU may request a PUSCH transmission in the next radio frame.

An UL HARQ process may consist of a series of PUSCH transmissions and PHICH/UL-grant receptions by the WTRU.

An UL HARQ process in the last radio frame of TDD UL/DL configuration X, may be mapped into a HARQ process of the TDD UL/DL configuration Y and may be continued in the first radio frame of the TDD UL/DL configuration Y, if at least one or a combination of the following scenarios occurs.

In a first scenario, the WTRU may receive PUSCH HARQ feedback (for example, PHICH) in the last radio frame of configuration X. This scenario may apply when at least one or a combination of the following conditions may happen: 1) In the last radio frame of TDD UL/DL configuration X the WTRU may have received a UL HARQ feedback (such as PHICH) in a subframe, for example, subframe n, which may have triggered a PUSCH retransmission in the subframe m of the next radio frame according to the timing of TDD UL/DL configuration X. 2) Subframe m in TDD UL/DL configuration Y may be a UL subframe, which may have contained a PUSCH retransmission triggered by a UL HARQ feedback (for example, PHICH) and/or UL grant in the previous radio frame according to the timing of TDD UL/DL configuration Y.

In this case the WTRU may retransmit the PUSCH in the subframe m of the first radio frame of the TDD UL/DL configuration Y and after it may continue to follow (or use) the UL HARQ timing of the UL subframe m according to the TDD UL/DL configuration Y, with possibly a few radio frames skipped during the transition as described in this document.

In a second scenario, the WTRU may transmit a PUSCH in the last radio frame of configuration X. This scenario may apply when at least one or a combination of the following conditions may happen: 1) In the last radio frame of TDD UL/DL configuration X the WTRU may have transmitted a PUSCH in a UL subframe, for example, UL subframe n, in which the WTRU may have been expecting a UL HARQ feedback (for example, PHICH) in the subframe m of the next radio frame according to the TDD UL/DL configuration X. 2) Subframe m in TDD UL/DL configuration Y may also contain a PHICH resource, which may have potentially contained a PHICH for a PUSCH transmission in the previous radio frame according to the timing of the TDD UL/DL configuration Y.

In this case the WTRU may expect an UL HARQ feedback (for example, PHICH) in the subframe m of the first radio frame of the TDD UL/DL configuration Y and after that the WTRU may continue to follow (or use) the HARQ timing of the UL HARQ feedback received in the subframe m according to the timing of the TDD UL/DL configuration Y, with possibly a few radio frames skipped during the transition as described in this document.

Table 7b illustrates examples of the maximum number of UL HARQ processes which may be transferred from TDD UL/DL configuration X to TDD UL/DL configuration Y when the WTRU follows the timing of TDD UL/DL configuration X during the transition. Considering the above scenarios and provided solutions, the maximum number of transferred UL HARQ processes may be calculated for each pair of X and Y TDD UL/DL configurations and may be as presented in Table 7b.

TABLE 7b

| Pair (X, Y) | Y = 0 | Y = 1 | Y = 2 | Y = 3 | Y = 4 | Y = 5 | Y = 6 |
|---|---|---|---|---|---|---|---|
| X = 0 | — | 3 | 1 | 3 | 2 | 1 | 4 |
| X = 1 | 3 | — | 1 | 2 | 2 | 1 | 3 |
| X = 2 | 1 | 1 | — | 1 | 1 | 1 | 1 |
| X = 3 | 3 | 2 | 1 | — | 2 | 1 | 3 |
| X = 4 | 2 | 2 | 1 | 2 | — | 1 | 2 |
| X = 5 | 1 | 1 | 1 | 1 | 1 | — | 1 |
| X = 6 | 4 | 3 | 1 | 3 | 2 | 1 | — |

Figure 5:
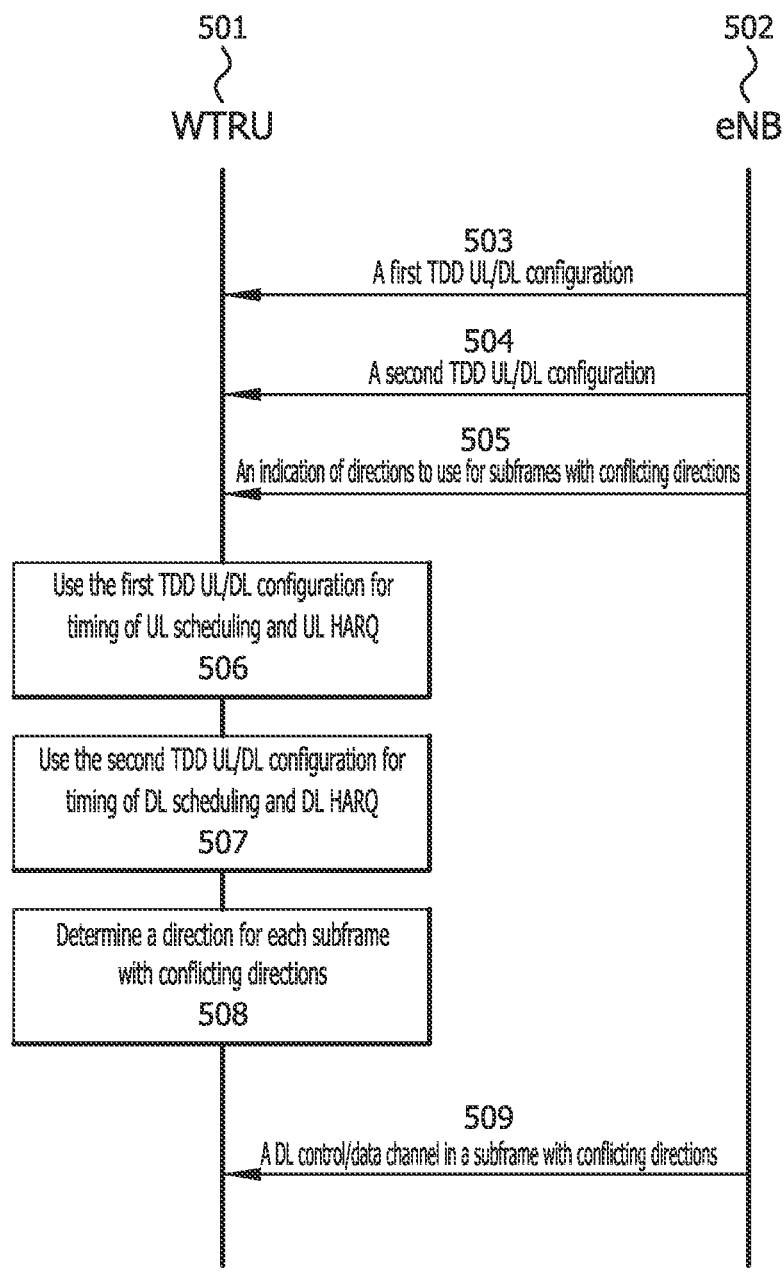
FIG. 5 shows a first example method for TDD operation in a WTRU.

FIG. 5 shows a first example of TDD operation in a WTRU. The WTRU 501 may receive 503 a first TDD UL/DL configuration for a cell (which may be a serving cell) from an eNB 502. The WTRU 501 may receive 504 a second TDD UL/DL configuration for the cell from the eNB 502. The WTRU 501 may receive 505 an indication of directions to use for subframes with conflicting directions between the first TDD UL/DL configuration and the second TDD UL/DL configuration from the eNB 502. The WTRU 501 may follow (or use) 506 the first TDD UL/DL configuration for timing of UL scheduling and UL HARQ. The WTRU 501 may follow (or use) 507 the second TDD UL/DL configuration for timing of DL scheduling and DL HARQ. The WTRU 501 may determine 508 a direction for each subframe with conflicting directions based on the received indication. On a condition that the determined direction for a subframe with conflicting directions is DL, the WTRU 501 may receive 509 a control and/or data channel in the subframe in the DL from the eNB 502. The first TDD UL/DL configuration may be cell-specific and may be transmitted by the eNB in a system information block. The second TDD UL/DL configuration may be WTRU-specific and may be transmitted by the eNB in RRC signaling which may be WTRU-specific or dedicated signaling. The indication of directions to use for subframes with conflicting directions may be transmitted by the eNB in RRC or physical layer signaling.

Figure 6:
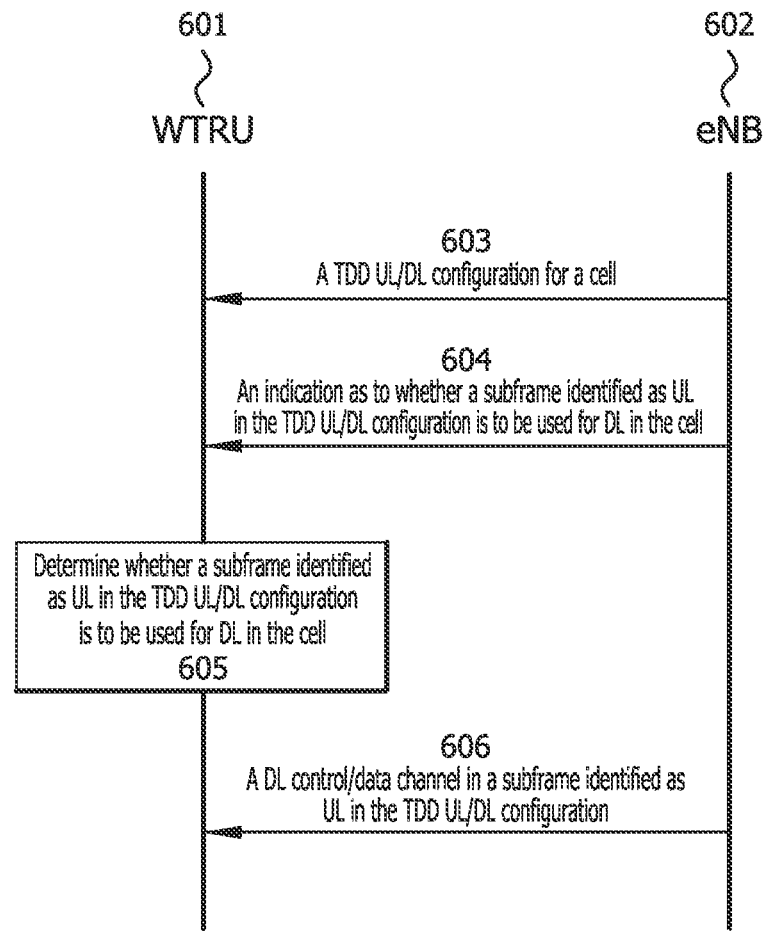
FIG. 6 shows a second example method for TDD operation a WTRU.

FIG. 6 shows a second example of TDD operation in a WTRU. The WTRU 601 may receive 603 a cell-specific TDD UL/DL configuration for a cell (which may be a serving cell) from an eNB 602. The WTRU 601 may receive 604 an indication as to whether a subframe identified as UL in the cell-specific TDD UL/DL configuration is to be or is intended to be used for DL for the cell where the indication may be received from the eNB 602. The WTRU 601 may determine 605 based on the indication whether the subframe identified as UL in the cell-specific TDD UL/DL configuration is to be or is intended to be used for DL for the cell. On a condition that the subframe identified as UL in the cell-specific TDD UL/DL configuration is determined to be used for (or determined to be intended to be used for) DL for the cell, the WTRU 601 may receive 606 a control and/or data channel in the subframe in the DL for the cell where the control and/or data channel may be received from the eNB 602. The cell-specific TDD UL/DL configuration may be transmitted by the eNB in a system information block.

Figure 7:
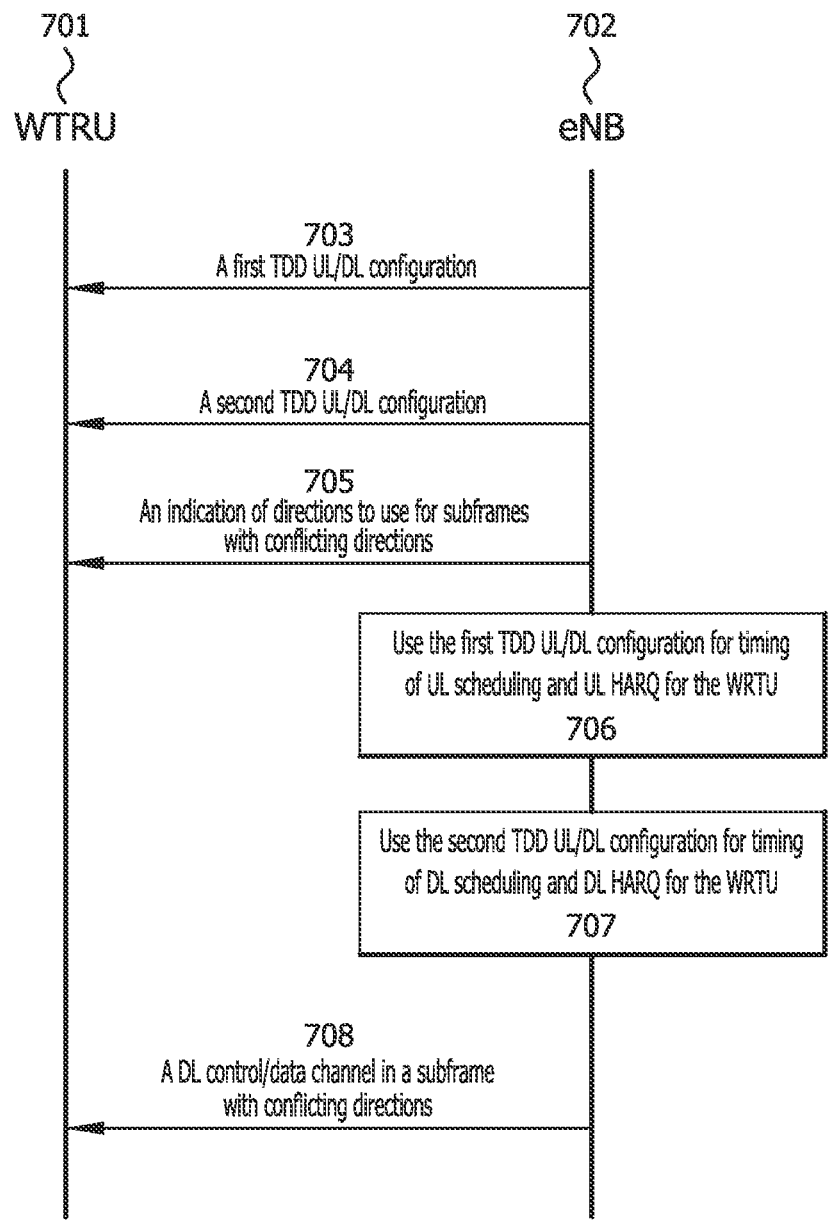
FIG. 7 shows a first example method for TDD operation in an eNB.

FIG. 7 shows a first example of TDD operation in an eNB. The eNB 702 may transmit 703 a first TDD UL/DL configuration for a cell to the WTRU 701. The eNB 702 may transmit 704 a second TDD UL/DL configuration for the cell to the WTRU 701. The eNB 702 may transmit 705 an indication of directions to use for subframes with conflicting directions between the first TDD UL/DL configuration and the second TDD UL/DL configuration to the WTRU 701. The eNB 702 may follow (or use) 706 the first TDD UL/DL configuration for timing of UL scheduling and UL HARQ for the WTRU 701. The eNB 702 may follow (or use) 707 the second TDD UL/DL configuration for timing of DL scheduling and DL HARQ for the WTRU. The eNB 702 may transmit 708 a control and/or data channel in the DL to the WTRU 701 in a subframe which is UL in the first TDD UL/DL configuration. Such transmission may or may only be performed by the eNB in conflicting subframes which may be identified as DL in the transmitted indication 705. The first TDD UL/DL configuration may be cell-specific and may be transmitted by the eNB in a system information block. Transmission of the first TDD UL/DL configuration by the eNB 702 to the WTRU 701 may be by broadcast signaling which may not be specifically directed to the WTRU 701. The second TDD UL/DL configuration may be WTRU-specific and may be transmitted by the eNB in RRC signaling which may be WTRU-specific or dedicated signaling.

Figure 8:
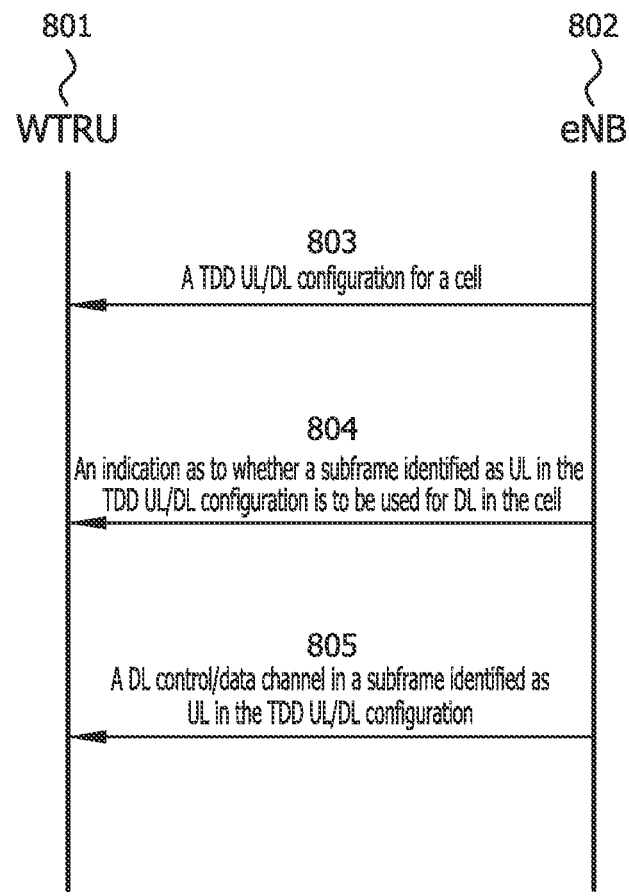
FIG. 8 shows a second example method for TDD operation in an eNB.

FIG. 8 shows a second example of TDD operation in an eNB. The eNB 802 may transmit 803 a cell-specific TDD UL/DL configuration for a cell to the WTRU 801. The eNB 802 may transmit 804 an indication as to whether a subframe identified as UL in the cell-specific TDD UL/DL configuration may be or is to be or is intended to be used for DL for the cell to the WTRU 801. The eNB 802 may transmit 805 a control and/or data channel in the DL in a subframe identified as UL in the cell-specific TDD UL/DL configuration for the cell to the WTRU 801. Such transmission may or may only be performed by the eNB in conflicting subframes which may be identified as DL in the transmitted indication 804.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for Time Division Duplex (TDD) operation in a wireless transmit/receive unit (WTRU), the method comprising:
   receiving, by the WTRU via a system information block (SIB), a first TDD uplink (UL)/downlink (DL) reference configuration for a serving cell, wherein the first TDD UL/DL reference configuration is cell-specific;
   receiving, by the WTRU, a second TDD UL/DL reference configuration for the serving cell;
   receiving, by the WTRU via physical layer signaling, a third TDD UL/DL reference configuration for the serving cell;
   using, by the WTRU, the received first TDD UL/DL reference configuration for timing of UL scheduling and UL Hybrid Automatic Repeat Request (HARQ);
   using, by the WTRU, the received second TDD UL/DL reference configuration for timing of DL HARQ; and
   determining, by the WTRU, a UL or DL direction for a subframe based on the received third TDD UL/DL reference configuration;
   wherein on a condition that the determined direction for the subframe is DL, receiving DL transmissions in the subframe.

2. The method of claim 1, wherein the receiving DL transmissions in the subframe includes at least one of monitoring a Physical Downlink Control Channel (PDCCH), monitoring an enhanced PDCCH (EPDCCH), decoding a Physical Hybrid Automatic Repeat Request (ARQ) Indicator Channel (PHICH), and decoding a Physical Downlink Shared Channel (PDSCH).

3. The method of claim 1, wherein the second TDD UL/DL reference configuration is WTRU-specific.

4. The method of claim 1, further comprising:
   cancelling, by the WTRU, a scheduled UL transmission for a specific subframe on a condition that the specific subframe is indicated as DL.

5. The method of claim 1, wherein the SIB is a SIB1.

6. The method of claim 1, wherein on a condition that the WTRU does not receive the third TDD UL/DL reference configuration, the WTRU performs blind decoding in a subframe indicated as DL in the first TDD UL/DL reference configuration.

7. The method of claim 6, wherein blind decoding includes monitoring at least one of a Physical Downlink Control Channel (PDCCH) and an enhanced PDCCH (EPDCCH).

8. The method of claim 6, wherein blind decoding is not performed in a subframe in which the WTRU has a scheduled UL transmission and the WTRU transmits as scheduled in the subframe.

9. The method of claim 6, wherein the WTRU receives a Physical Hybrid ARQ Indicator Channel (PHICH) in a subframe in which a PHICH intended for the WTRU is expected by the WTRU.

10. The method of claim 1, wherein the third TDD UL/DL reference configuration is WTRU-specific.

11. The method of claim 1, wherein the third TDD UL/DL reference configuration is received in a current reconfiguration period; and
   wherein the determination of the UL or DL direction is determined for at least one subframe of the current reconfiguration period and a plurality of subframes of a next reconfiguration period.

12. The method of claim 11, wherein the reconfiguration period occurs periodically.

13. The method of claim 1, further comprising:
   on a condition that the third TDD UL/DL reference configuration is not received in a reconfiguration period, blind decoding, by the WTRU, in a subframe indicated as a DL subframe in the first TDD UL/DL configuration.

14. The method of claim 11, wherein the reconfiguration period is a radio frame.

15. A method for Time Division Duplex (TDD) in an evolved Node B (eNB), the method comprising:
   transmitting, by the eNB via a system information block (SIB), a first TDD uplink (UL)/downlink (DL) reference configuration for a cell, wherein the first TDD UL/DL reference configuration is cell-specific;
   transmitting, by the eNB, a second TDD UL/DL reference configuration for the cell to at least one WTRU;
   transmitting, by the eNB via physical layer signaling, a third TDD UL/DL reference configuration for the cell to the at least one WTRU;
   using, by the eNB, for the at least one WTRU the first TDD UL/DL reference configuration for timing of UL scheduling and UL Hybrid Automatic Repeat Request (HARQ);
   using, by the eNB, for the at least one WTRU the second UL/DL reference configuration for timing of DL HARQ; and
   transmitting, by the eNB, DL transmissions in at least one subframe which is DL in the third TDD UL/DL reference configuration.

16. The method of claim 15, wherein the eNB uses the first TDD UL/DL reference configuration for both the UL and DL scheduling and HARQ operations for at least one other WTRU.

17. The method of claim 15, wherein the second TDD UL/DL reference configuration is WTRU-specific.

18. The method of claim 15, wherein the third TDD UL/DL reference configuration is WTRU-specific.

19. The method of claim 15, wherein the third TDD UL/DL reference configuration is transmitted in a current reconfiguration period; and
   wherein the determination of the UL or DL direction is determined for at least one subframe of the current reconfiguration period and a plurality of subframes of a next reconfiguration period.

20. The method of claim 15, wherein the SIB is a SIB 1.

21. The method of claim 19, wherein the reconfiguration period occurs periodically.

22. The method of claim 19, wherein the reconfiguration period is a radio frame.

23. A wireless transmit/receive unit (WTRU) for Time Division Duplex (TDD) operation comprising:

a transceiver operatively coupled to a processor, the transceiver and the processor configured to receive, via a system information block (SIB), a first TDD uplink (UL)/downlink (DL) reference configuration for a serving cell, wherein the first TDD UL/DL reference configuration is cell-specific;

the transceiver and the processor further configured to receive a second TDD UL/DL reference configuration for the serving cell;

the transceiver and the processor further configured to receive, via physical layer signaling, a third TDD UL/DL reference configuration for the serving cell;

the transceiver and the processor further configured to use the received first TDD UL/DL reference configuration for timing of UL scheduling and UL Hybrid Automatic Repeat Request (HARQ);

the transceiver and the processor further configured to use the received second TDD UL/DL reference configuration for timing of DL HARQ; and the transceiver and the processor further configured to determine a UL or DL direction for a subframe based on the received third TDD UL/DL reference configuration;

wherein on a condition that the determined direction for the subframe is DL, the transceiver and the processor further configured to receive DL transmissions in the subframe.

24. The WTRU of claim 23, wherein to receive DL transmissions in the subframe includes at least one of monitoring a Physical Downlink Control Channel (PDCCH), monitoring an enhanced PDCCH (EPDCCH), decoding a Physical Hybrid Automatic Repeat Request (ARQ) Indicator Channel (PHICH), and decoding a Physical Downlink Shared Channel (PDSCH).

25. The WTRU of claim 23, wherein the second TDD UL/DL reference configuration is WTRU-specific.

26. The WTRU of claim 23, wherein the third TDD UL/DL reference configuration is WTRU-specific.

27. The WTRU of claim 23, wherein the third TDD UL/DL reference configuration is received in a current reconfiguration period; and wherein the determination of the UL or DL direction is determined for at least one subframe of the current reconfiguration period and a plurality of subframes of a next reconfiguration period.

28. The WTRU of claim 27, wherein the reconfiguration period occurs periodically.

29. The WTRU of claim 27, wherein the reconfiguration period is a radio frame.

30. The WTRU of claim 23, wherein the SIB is a SIB 1.

* * * * *